(12) United States Patent
King et al.

(10) Patent No.: US 10,479,661 B2
(45) Date of Patent: Nov. 19, 2019

(54) LIFT AND PALLET

(71) Applicant: Rehrig Pacific Company, Los Angeles, CA (US)

(72) Inventors: Philip A. King, Sugar Hill, GA (US); Jon P. Hassell, Atlanta, GA (US); William P. Apps, Alpharetta, GA (US); Dane Gin Mun Kalinowski, Foothill Ranch, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 15/434,909

(22) Filed: Feb. 16, 2017

(65) Prior Publication Data
US 2017/0297881 A1 Oct. 19, 2017

Related U.S. Application Data

(60) Provisional application No. 62/362,576, filed on Jul. 14, 2016, provisional application No. 62/296,041, filed on Feb. 16, 2016.

(51) Int. Cl.
*B66F 9/14* (2006.01)
*B66F 9/065* (2006.01)
*B65D 19/00* (2006.01)

(52) U.S. Cl.
CPC .......... *B66F 9/143* (2013.01); *B65D 19/0018* (2013.01); *B66F 9/065* (2013.01); *B65D 2519/00034* (2013.01); *B65D 2519/00069* (2013.01); *B65D 2519/0094* (2013.01); *B65D 2519/00268* (2013.01); *B65D 2519/00288* (2013.01); *B65D 2519/00308* (2013.01);
(Continued)

(58) Field of Classification Search
CPC .............. B62B 3/0643; B62B 2203/22; B62B 2203/24; B62B 2203/26; B66F 9/143; B66F 9/144
USPC .................................................. 414/667, 671
See application file for complete search history.

(56) References Cited

U.S. PATENT DOCUMENTS 2,544,657 A 3/1951 Cushman
2,916,239 A 12/1959 Stopps
(Continued)

FOREIGN PATENT DOCUMENTS

DE 2232200 A1 1/1973
DE 2613083 A1 10/1977
(Continued)

OTHER PUBLICATIONS

U.S. Appl. No. 15/639,266, filed Jun. 30, 2017.
U.S. Appl. No. 15/788,967, filed Oct. 20, 2017.
U.S. Appl. No. 15/606,598, filed May 26, 2017.

*Primary Examiner* — James Keenan
(74) *Attorney, Agent, or Firm* — Carlson, Gaskey & Olds, P.C.

(57) ABSTRACT

A pallet lift includes a pair of outer tines movable between an expanded position spaced outward away from inner tines and a retracted position adjacent the inner tines. The inner and outer tines are supported by wheels at locations spaced away from the lift mechanism. A pallet includes a plurality of nestable feet that open outwardly of the pallet to reduce the footprint. A second pallet includes a side wall extending downward from side edges of the pallet to define an opening adjacent outer feet.

11 Claims, 24 Drawing Sheets

(52) U.S. Cl.
CPC .......... B65D 2519/00318 (2013.01); B65D 2519/00338 (2013.01); B65D 2519/00407 (2013.01); B65D 2519/00467 (2013.01); B65D 2519/00472 (2013.01); B65D 2519/00771 (2013.01); B65D 2519/00796 (2013.01)

(56) References Cited

U.S. PATENT DOCUMENTS

| | | | |
|---|---|---|---|
| 2,925,999 A * | 2/1960 | Hopkins, Jr. | B62B 3/0618 254/10 C |
| 2,958,436 A * | 11/1960 | Skutle | B66F 9/148 414/667 |
| 3,387,731 A * | 6/1968 | Gibson | B66F 9/16 414/639 |
| 3,424,110 A | 1/1969 | Toot | |
| 3,526,195 A | 9/1970 | Maryonovich | |
| 3,640,229 A | 2/1972 | Bell | |
| 3,685,461 A | 8/1972 | Belcher | |
| 3,685,463 A | 8/1972 | Francis | |
| D225,397 S | 12/1972 | Lindley | |
| 3,709,162 A | 1/1973 | Roper | |
| 3,763,965 A * | 10/1973 | Riekkinen | B60P 3/035 187/231 |
| 4,013,021 A | 3/1977 | Steinlein et al. | |
| 4,133,270 A | 1/1979 | Ravera | |
| D258,948 S | 4/1981 | Stump, Jr. | |
| 4,263,855 A | 4/1981 | Lawlor | |
| 4,428,306 A | 1/1984 | Dresen et al. | |
| 4,533,290 A * | 8/1985 | Hackauf | B66F 9/148 414/667 |
| 4,879,956 A | 11/1989 | Shuert | |
| 5,046,434 A | 9/1991 | Breezer et al. | |
| 5,088,418 A | 2/1992 | Reckermann et al. | |
| 5,096,363 A * | 3/1992 | Weinert | B66F 9/143 414/667 |
| 5,117,762 A | 6/1992 | Shuert | |
| 5,168,817 A | 12/1992 | Nulle et al. | |
| 5,341,748 A | 8/1994 | Liu | |
| 5,403,024 A * | 4/1995 | Frketic | B62B 3/06 280/43.12 |
| 5,527,585 A | 6/1996 | Needham et al. | |
| 5,566,624 A | 10/1996 | Brown et al. | |
| 5,606,921 A | 3/1997 | Elder et al. | |
| 5,638,760 A | 6/1997 | Jordan et al. | |
| 5,664,934 A | 9/1997 | Schaede et al. | |
| D388,931 S | 1/1998 | Constantino et al. | |
| 5,755,162 A | 5/1998 | Knight et al. | |
| 5,769,001 A | 6/1998 | Viessmann | |
| 5,769,003 A | 6/1998 | Rose et al. | |
| 5,791,262 A | 8/1998 | Knight et al. | |
| 5,813,355 A | 9/1998 | Brown et al. | |
| D400,681 S | 11/1998 | Sadr | |
| D400,682 S | 11/1998 | Constantino et al. | |
| 5,857,416 A | 1/1999 | Donnell, Jr. et al. | |
| 5,950,545 A | 9/1999 | Shuert | |
| 5,964,162 A | 10/1999 | Chuan-Jen | |
| 5,996,508 A | 12/1999 | Constantino et al. | |
| 6,289,823 B1 | 9/2001 | Koefelda et al. | |
| 6,294,114 B1 | 9/2001 | Muirhead | |
| 6,327,984 B1 | 12/2001 | McCann et al. | |
| 6,718,888 B2 | 4/2004 | Muirhead | |
| D513,104 S | 12/2005 | Harding et al. | |
| 6,997,113 B1 | 2/2006 | Harding et al. | |
| 7,114,906 B1 * | 10/2006 | Baumgarner | B62B 3/06 414/495 |
| D548,924 S | 8/2007 | Frankenberg | |
| 7,293,509 B2 | 10/2007 | Hassell | |
| 7,360,493 B2 | 4/2008 | Hummel et al. | |
| 7,632,055 B2 * | 12/2009 | Foroni | B66F 9/148 414/667 |
| 7,641,011 B2 * | 1/2010 | Fridlington, Jr. | B62B 3/0618 180/68.5 |
| 7,690,315 B2 | 4/2010 | Apps | |
| 7,735,429 B2 | 6/2010 | Meissen | |
| 7,819,068 B2 | 10/2010 | Apps et al. | |
| 7,856,932 B2 | 12/2010 | Stahl et al. | |
| 7,976,032 B1 * | 7/2011 | Dockins | B62B 3/0618 187/229 |
| 7,987,797 B2 | 8/2011 | Stahl et al. | |
| 7,988,405 B2 | 8/2011 | Ellington | |
| 8,011,677 B1 | 9/2011 | Ellington et al. | |
| 8,075,244 B2 | 12/2011 | Ellington | |
| 8,191,486 B2 | 6/2012 | Apps et al. | |
| 8,196,527 B2 | 6/2012 | Linares | |
| 8,230,793 B2 | 7/2012 | Apps | |
| 8,282,111 B2 | 10/2012 | Hailston et al. | |
| 8,291,839 B2 | 10/2012 | Apps et al. | |
| 8,360,443 B2 | 1/2013 | Ellington | |
| 8,448,583 B2 | 5/2013 | Apps et al. | |
| 8,585,344 B2 * | 11/2013 | Sharp | B66F 9/142 187/237 |
| 8,776,697 B1 | 7/2014 | O'Connell | |
| 8,894,076 B2 | 11/2014 | Hailston et al. | |
| 8,950,759 B2 | 2/2015 | Thorsen et al. | |
| D724,809 S | 3/2015 | Howland et al. | |
| 8,967,056 B2 | 3/2015 | Apps et al. | |
| 8,979,099 B1 * | 3/2015 | Ellis | B66F 9/142 280/43.12 |
| D729,488 S | 5/2015 | Pulskamp et al. | |
| 9,027,487 B1 † | 5/2015 | O'Connell | |
| 9,169,040 B2 | 10/2015 | Evans et al. | |
| 9,260,125 B2 | 2/2016 | Ellington et al. | |
| D753,392 S | 4/2016 | Haas et al. | |
| D756,645 S | 5/2016 | Haas et al. | |
| 9,387,953 B2 | 7/2016 | Takyar et al. | |
| 9,403,547 B2 | 9/2016 | Ellington | |
| 9,611,071 B2 | 4/2017 | Baltz et al. | |
| 2001/0029874 A1 | 10/2001 | Muirhead | |
| 2002/0017225 A1 | 2/2002 | Koefelda et al. | |
| 2004/0134390 A1 | 7/2004 | Apps et al. | |
| 2004/0168618 A1 | 9/2004 | Muirhead | |
| 2005/0211139 A1 | 9/2005 | Perrotta et al. | |
| 2006/0032411 A1 | 2/2006 | Hummel et al. | |
| 2006/0162624 A1 | 7/2006 | Hassell | |
| 2006/0254476 A1 | 11/2006 | MacDonald et al. | |
| 2007/0116548 A1 * | 5/2007 | Cooper | B62B 3/06 414/619 |
| 2007/0210542 A1 | 9/2007 | Hammond | |
| 2007/0272640 A1 | 11/2007 | Garcia | |
| 2008/0060561 A1 | 3/2008 | Carrasco | |
| 2008/0199292 A1 * | 8/2008 | Gatteschi | B66F 9/063 414/607 |
| 2008/0295748 A1 | 12/2008 | Yoshida et al. | |
| 2009/0050030 A1 | 2/2009 | Apps et al. | |
| 2009/0183953 A1 | 7/2009 | Ellington | |
| 2009/0185890 A1 | 7/2009 | Ellington | |
| 2010/0043678 A1 | 2/2010 | Linares | |
| 2010/0095875 A1 | 4/2010 | Hailston et al. | |
| 2010/0196134 A1 | 8/2010 | Stahl et al. | |
| 2010/0295261 A1 | 11/2010 | Ellington | |
| 2011/0100268 A1 | 5/2011 | Milkowski et al. | |
| 2011/0139040 A1 | 6/2011 | Apps et al. | |
| 2011/0171000 A1 | 7/2011 | Hailston | |
| 2012/0291678 A1 | 11/2012 | Howland et al. | |
| 2012/0319063 A1 | 12/2012 | Hailston et al. | |
| 2013/0177374 A1 * | 7/2013 | Matti | B66F 9/12 414/667 |
| 2013/0202400 A1 | 8/2013 | Richard et al. | |
| 2013/0223962 A1 | 8/2013 | Ellington et al. | |
| 2014/0000493 A1 | 1/2014 | Apps et al. | |
| 2014/0283713 A1 | 9/2014 | Baltz et al. | |
| 2015/0108037 A1 | 4/2015 | Evans et al. | |
| 2015/0135999 A1 | 5/2015 | Takyar et al. | |
| 2015/0225215 A1 | 8/2015 | King et al. | |
| 2016/0318656 A1 | 11/2016 | Takyar et al. | |
| 2016/0318657 A1 | 11/2016 | Takyar et al. | |
| 2017/0240194 A1 | 8/2017 | Kalinowski et al. | |
| 2017/0297881 A1 † | 10/2017 | King | |
| 2017/0341667 A1 | 11/2017 | Kalinowski et al. | |
| 2018/0029623 A1 | 2/2018 | Kalinowski et al. | |
| 2018/0162434 A1 | 7/2018 | Kalinowski et al. | |

(56) References Cited

U.S. PATENT DOCUMENTS

FOREIGN PATENT DOCUMENTS

| | | | |
|---|---|---|---|
| DE | 2733457 | 2/1979 | |
| DE | 3806097 | 9/1989 | |
| DE | 10154842 A1 * | 5/2003 | ............. B66F 9/143 |
| DE | 10216630 C1 * | 7/2003 | ............. B66F 9/143 |
| EP | 202203 | 11/1986 | |
| EP | 849184 | 6/1998 | |
| EP | 2028117 | 2/2009 | |
| EP | 2724956 | 4/2014 | |
| EP | 3415401 A1 * | 12/2018 | ........... B62B 5/0069 |
| FR | 1449377 | 8/1966 | |
| FR | 2206248 | 6/1974 | |
| FR | 2259023 | 8/1975 | |
| FR | 2274512 | 1/1976 | |
| FR | 2486029 | 1/1982 | |
| FR | 2783245 A1 * | 3/2000 | ............. B66F 9/143 |
| GB | 859186 | 1/1961 | |
| GB | 901340 | 7/1962 | |
| HU | 9303243 | 3/1994 | |
| HU | 9900326 | 5/1999 | |
| JP | 53058581 | 5/1978 | |
| JP | 04114859 | 4/1994 | |
| JP | 06179448 | 6/1994 | |
| JP | 06191536 | 7/1994 | |
| WO | WO9411262 | 5/1994 | |
| WO | WO2004063035 | 7/2004 | |
| WO | WO2005068309 | 7/2005 | |
| WO | WO-2012010160 A2 * | 1/2012 | ............. B66F 9/143 |

\* cited by examiner
† cited by third party

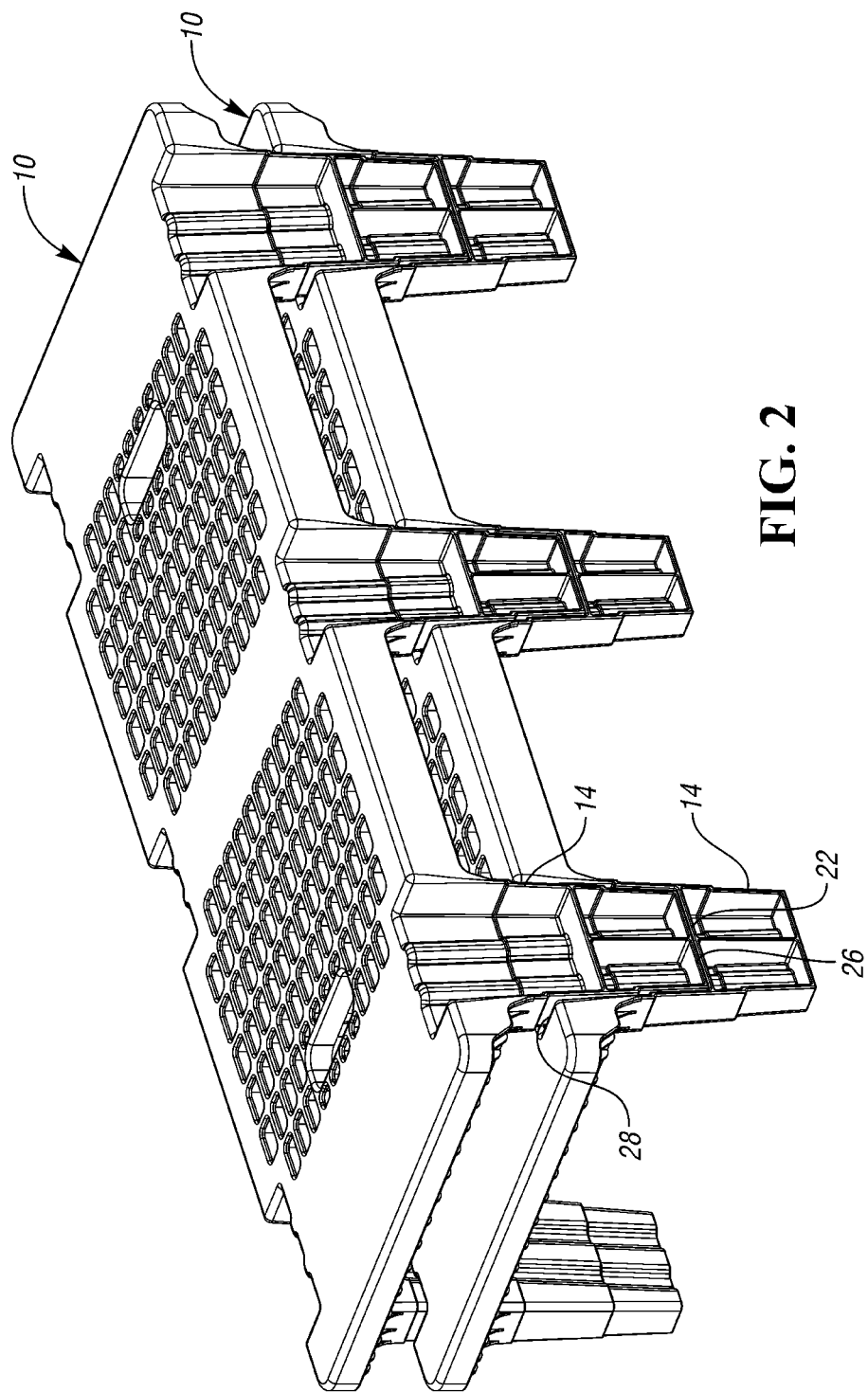

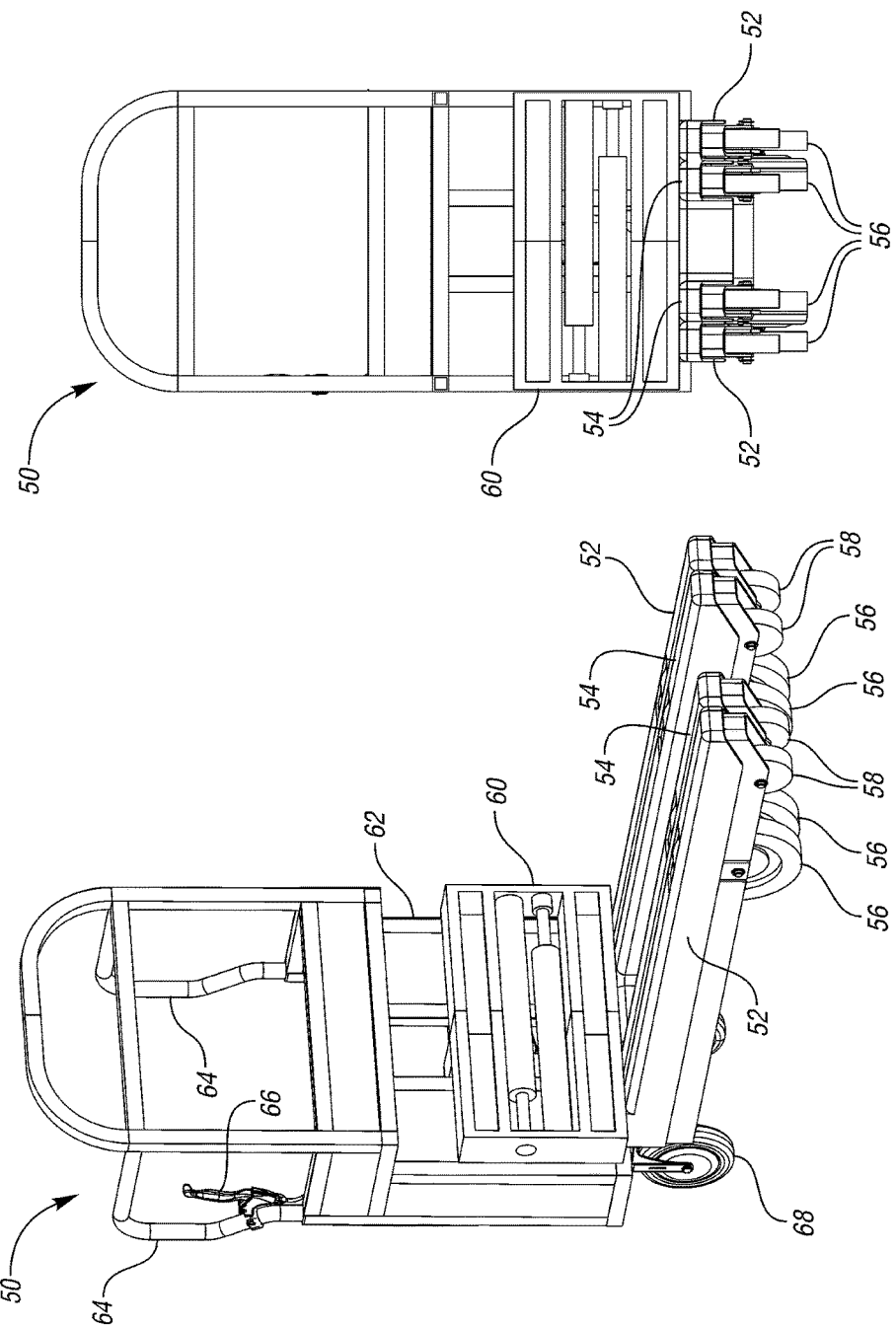

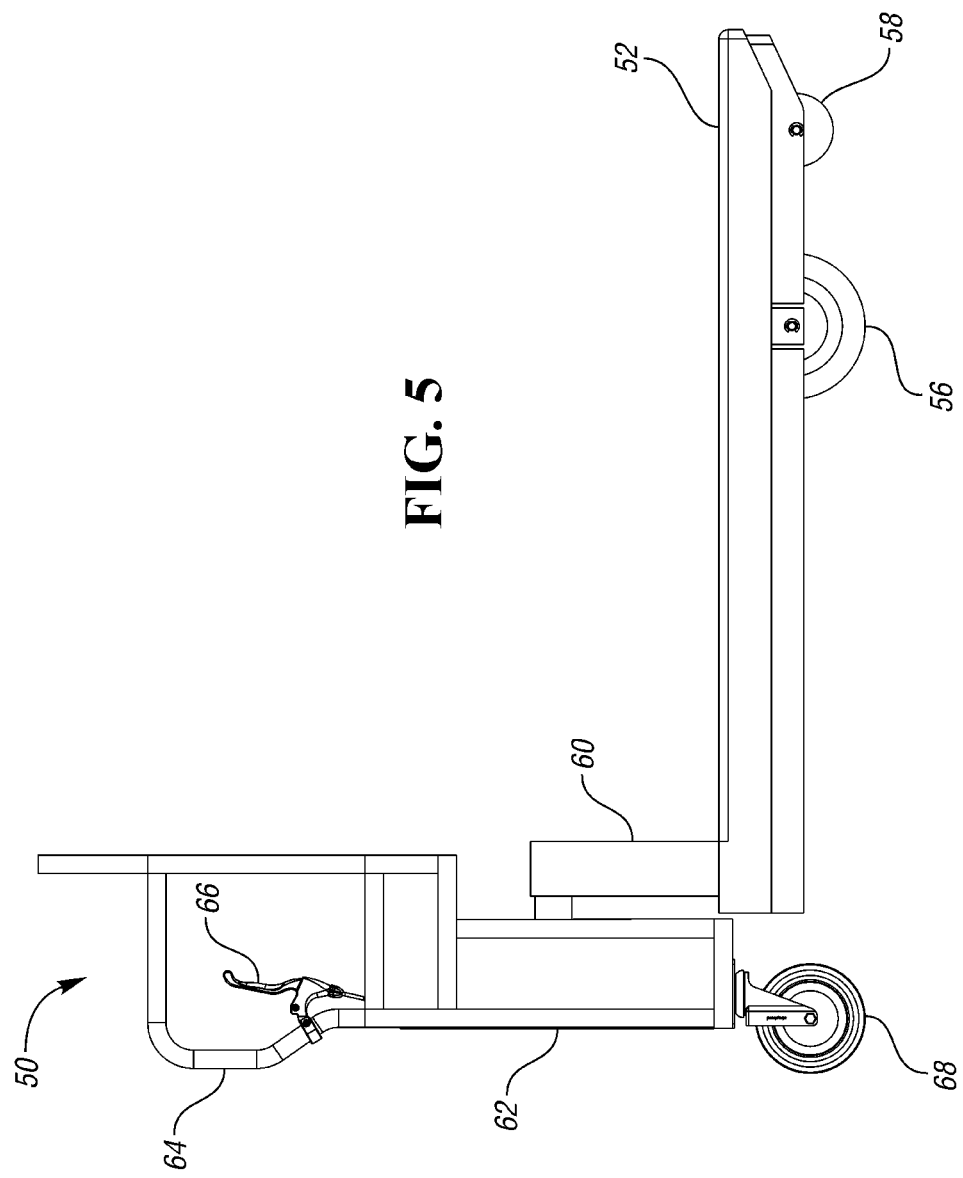

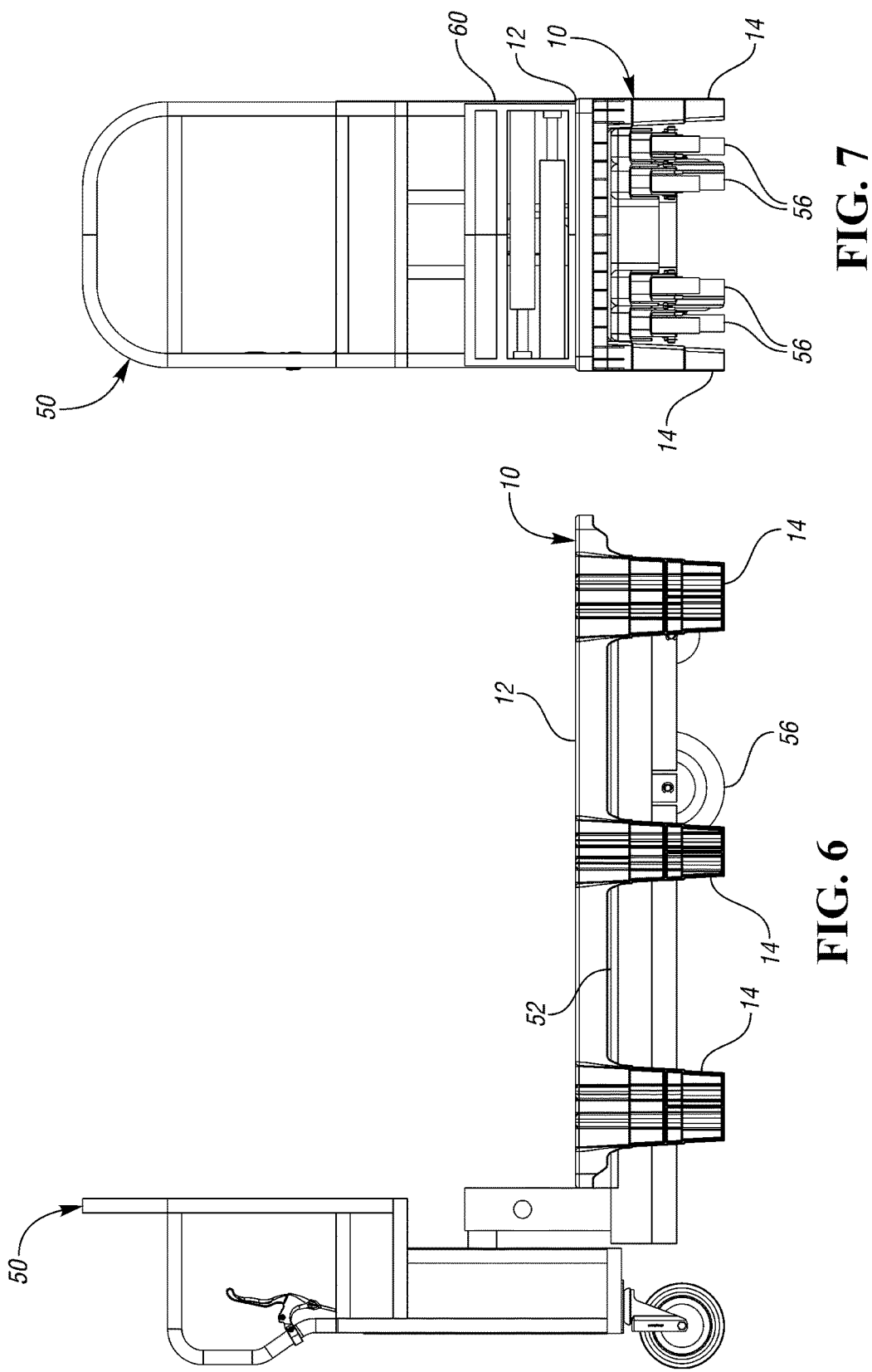

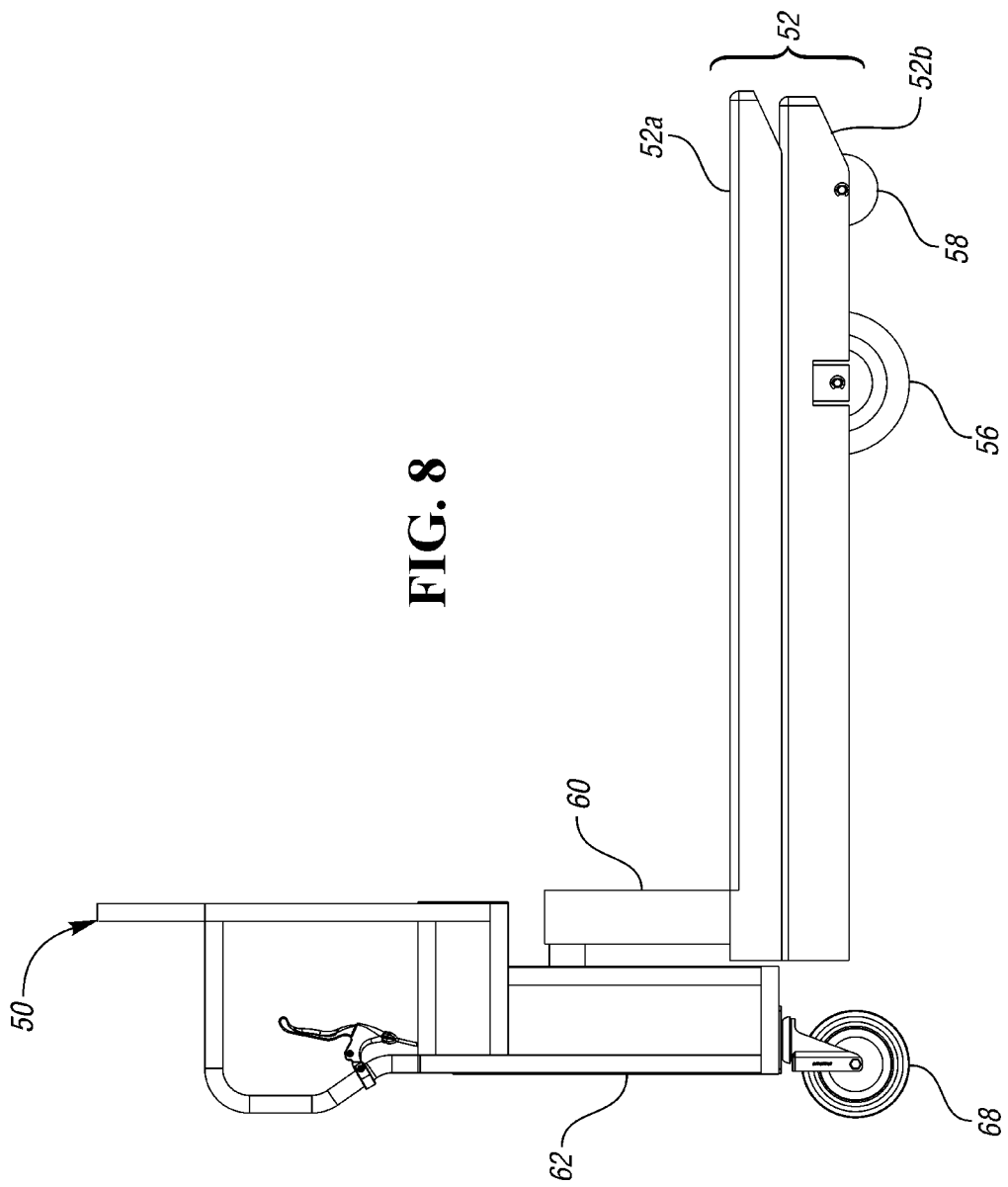

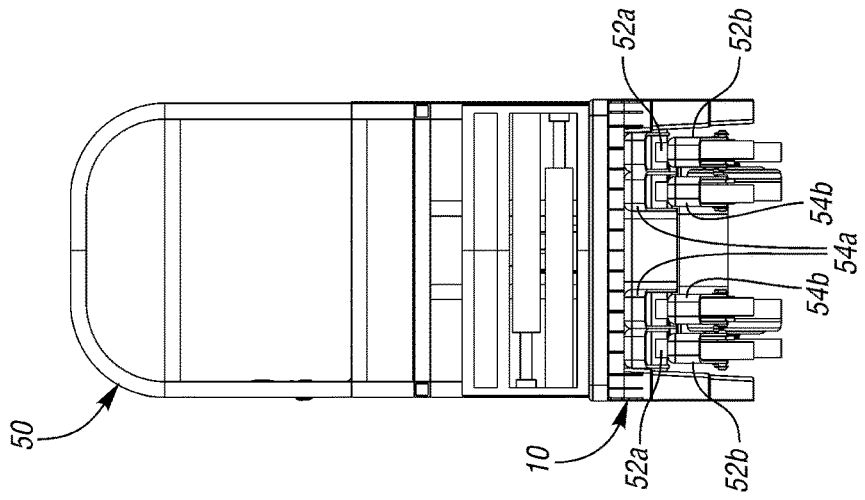
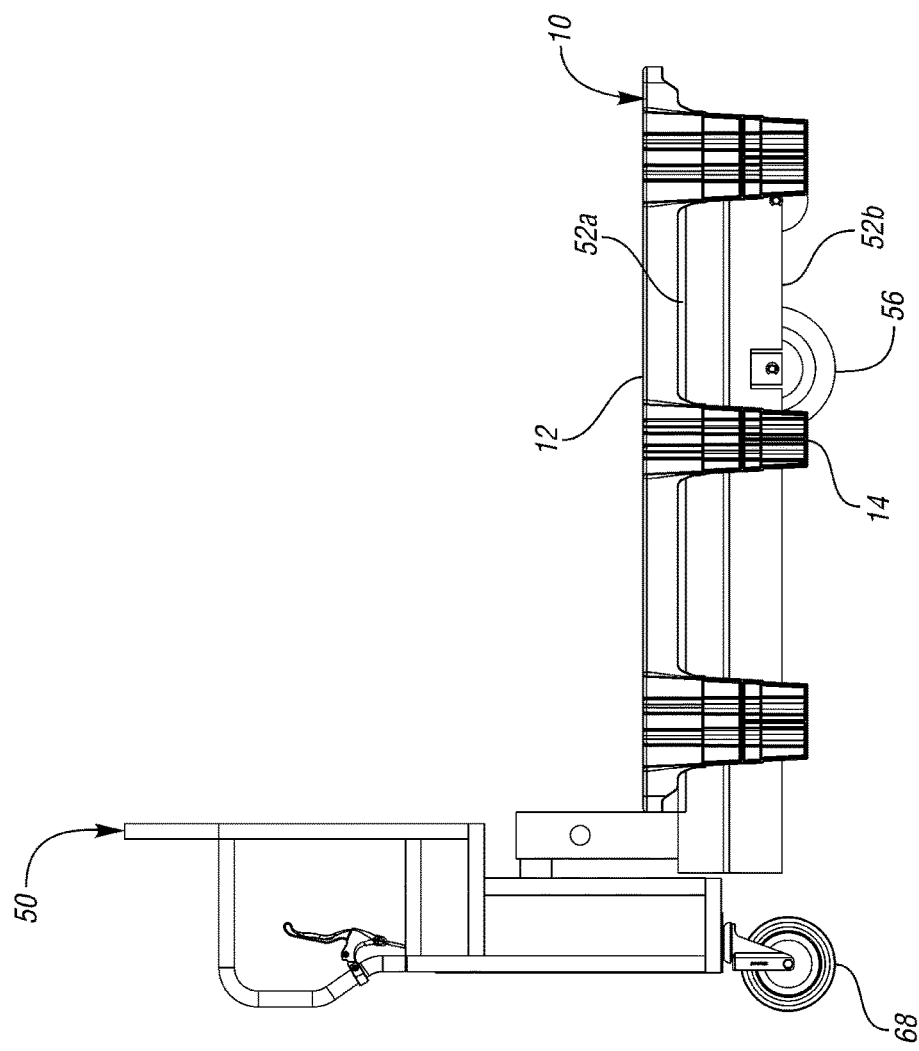

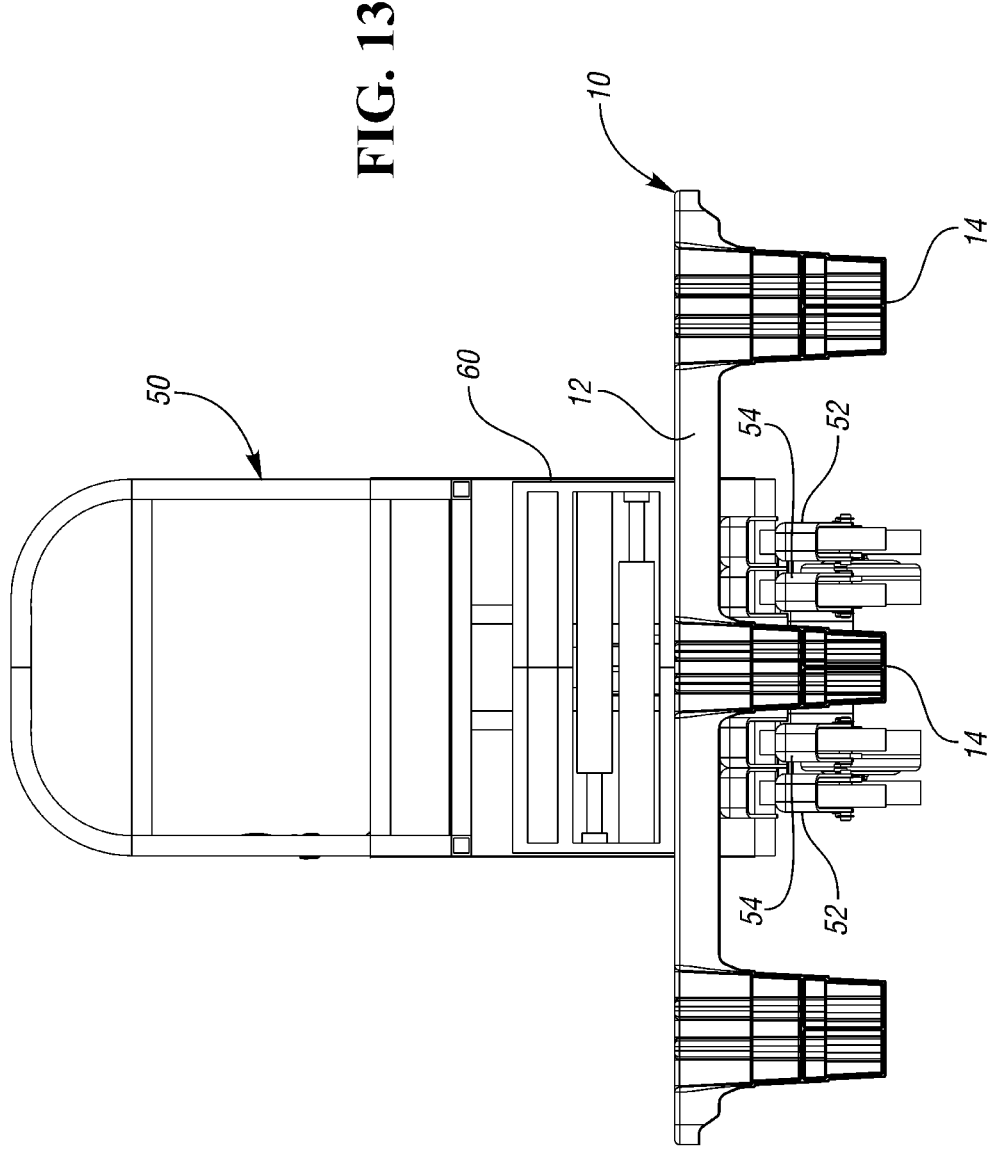

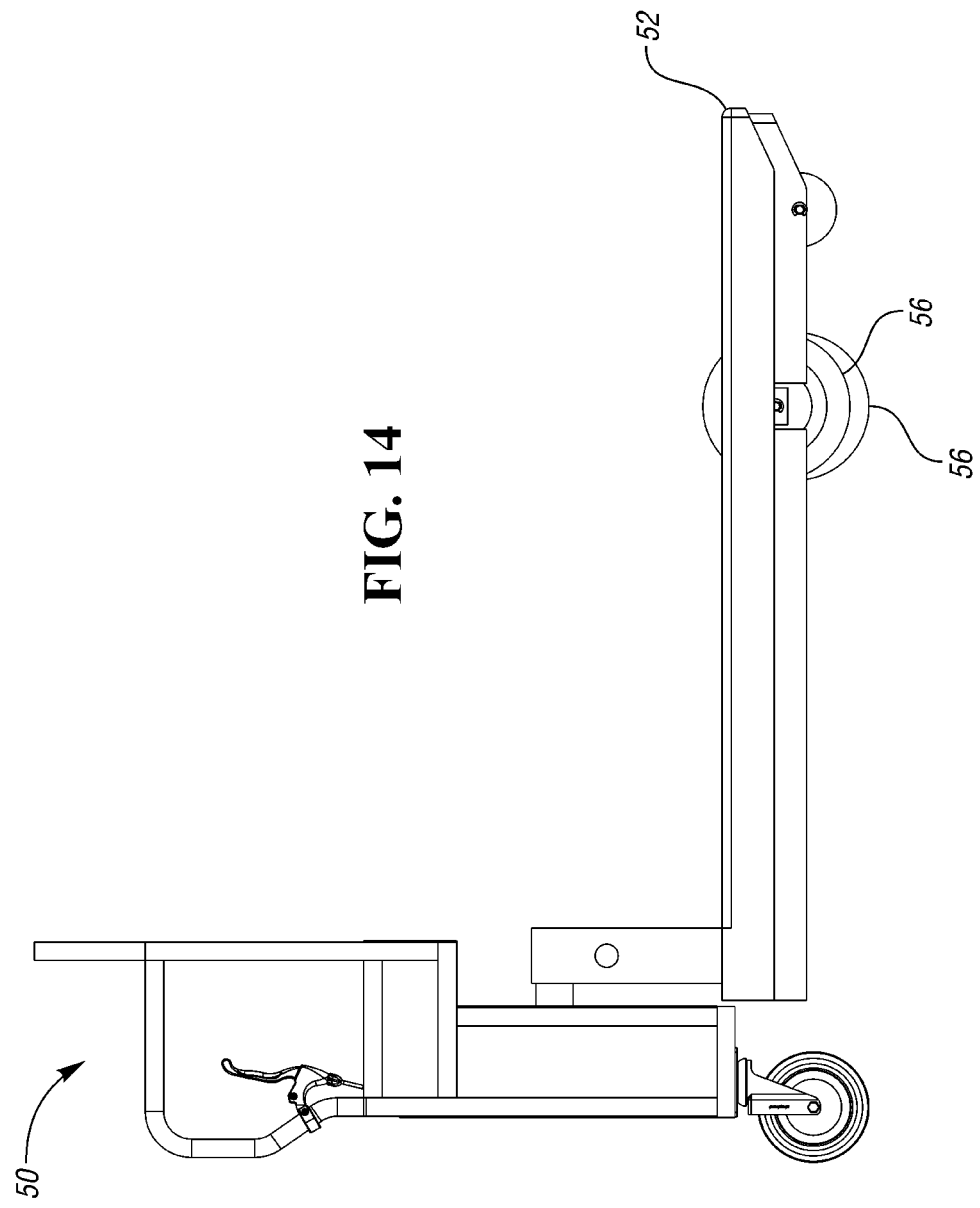

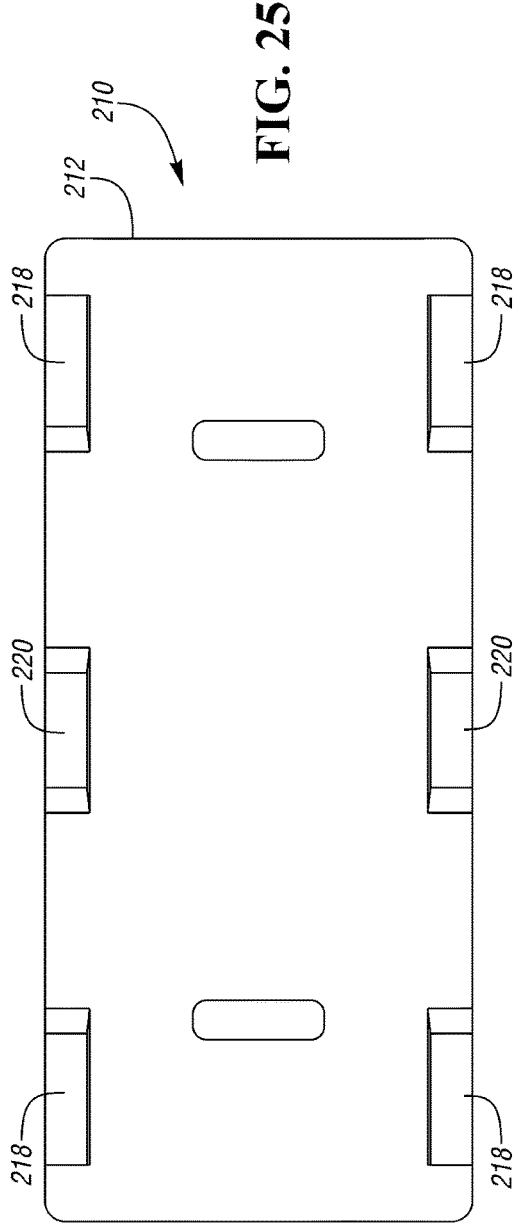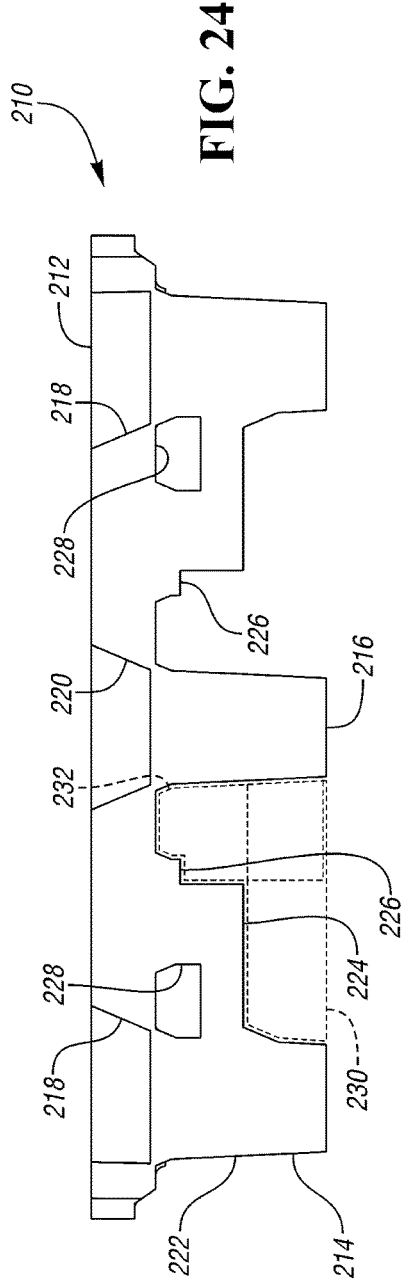

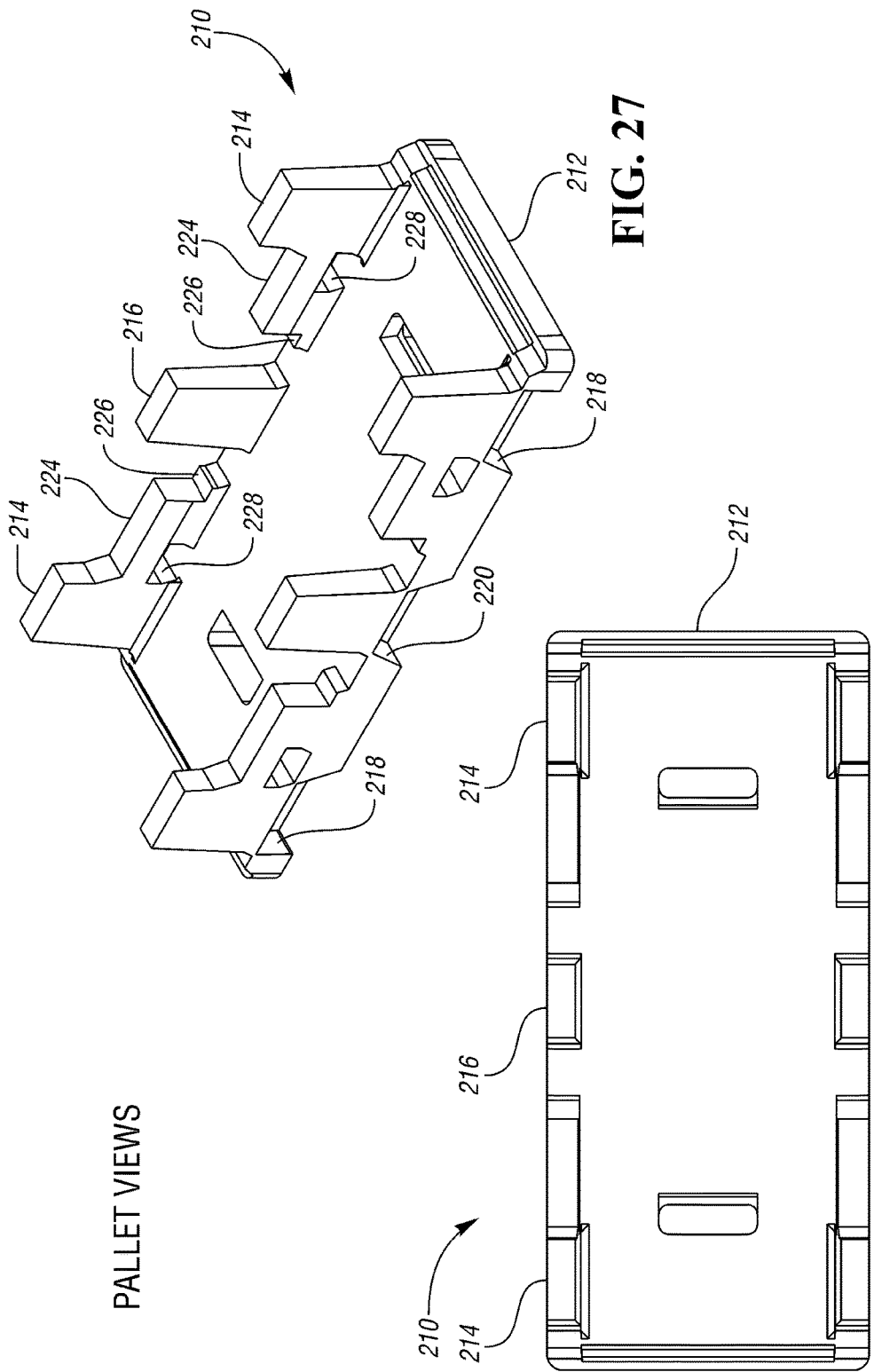

PALLET VIEWS - ABBA LIFT INTERFACE
LONG WALL ENTRY

PALLET VIEWS - ABBA LIFT INTERFACE
SHORT WALL ENTRY

PALLET VIEWS - STACKS

LIFT AND PALLET

BACKGROUND

Pallet lifts are used to move pallets loaded with goods around a warehouse or store. Larger lifts can be used to move more pallets at one time; however, these cannot be used in some applications. In some stores, the aisles are narrow and/or the walk-in coolers are too narrow for the larger pallet lifts.

SUMMARY

A first pallet lift includes a lift mechanism and at least one inner tine secured to the lift mechanism. At least one wheel supports the inner tines and is spaced away from the lift mechanism along a longitundinal axis of the inner tines. A pair of outer tines are secured to the lift mechanism and positioned outward of the inner tines. The pair of outer tines are movable between an expanded position spaced outward away from the inner tines and a retracted position adjacent the inner tines. The outer tines may also be supported by at least one wheel positioned away from the lift mechanism. Thus, the pallet may be used to support more than one pallet in the expanded position. In the retracted position, the pallet can enter the pallet from a short side so that both the pallet and the lift can navigate narrow aisles and coolers.

The outer tines may be movable to lift their wheels prior to the outer tines being moved to the expanded position from the retracted position. The outer tines may pivot to lift the wheels prior to expansion.

A first disclosed pallet that can be used with the lift includes a deck and a plurality of feet extending downward from the side edges of the deck. The feet are hollow and configured to receive the feet of an identical pallet nested thereon. The feet may be U-shaped in cross-section, opening outward of the deck to reduce the footprint of the pallet. The plurality of feet may be elongated in a direction parallel to the side edges of the deck.

The feet may each include an inner wall, opposed side walls extending outward from the inner wall, and a bottom wall generally perpendicular to the side walls and inner wall. The feet may each include a generally horizontal reinforcing wall spaced above the bottom wall and generally parallel to the bottom wall.

An alternative pallet includes a deck and a side wall extending downward from the side edges of the deck. Each side wall forms an inner foot and two outer feet. Each side wall forms at least one ledge having a lower surface spaced downward from the deck. Each ledge is adjacent one of the outer feet and has an opening formed therethrough for receiving a tine of a lift.

Each side wall may include a ledge adjacent each of the outer feet. The deck may include a recess above each of the plurality of feet configured to receive the foot of an identical pallet stacked thereon. The side walls may each form a key feature inward of each ledge, such that each key feature projects downward and inward toward the inner foot. Each side wall may defines a first opening between the ledge and the inner foot. Each side wall may define a second opening below the ledge and between the outer foot and the inner foot. The key feature may project into the first opening. The key feature is at a height that aligns with the opening formed through the ledge.

BRIEF DESCRIPTION OF THE DRAWINGS

FIG. 2 shows the pallet of FIG. 1 nested with an identical pallet.

FIG. 3 is a perspective view of a lift according to a first embodiment.

FIG. 4 is a front view of the lift of FIG. 3.

FIG. 5 is a side view of the lift of FIG. 3.

FIG. 6 is a side view of the lift of FIG. 3 in the lowered position received in the pallet of FIG. 1.

FIG. 7 is a front view of the lift and pallet of FIG. 6.

FIG. 8 is a side view of the lift of FIG. 3 in the raised position.

FIG. 9 is a side view of the lift and pallet of FIG. 6 in the raised position.

FIG. 10 is a front view of the lift and pallet of FIG. 9.

FIG. 13 shows an optional arrangement in which the pallet is supported perpendicularly to the tines.

FIG. 14 is a side view of the lift of FIG. 6 showing the outer tines lifted to raise the wheels off the floor.

FIG. 24 is a side view of the pallet of FIG. 23.

FIG. 25 is a top view of the pallet of FIG. 23.

FIG. 26 is a bottom view of the pallet of FIG. 23.

FIG. 27 is a bottom perspective view of the pallet of FIG. 23.

DETAILED DESCRIPTION OF A PREFERRED EMBODIMENT

Figure 1:
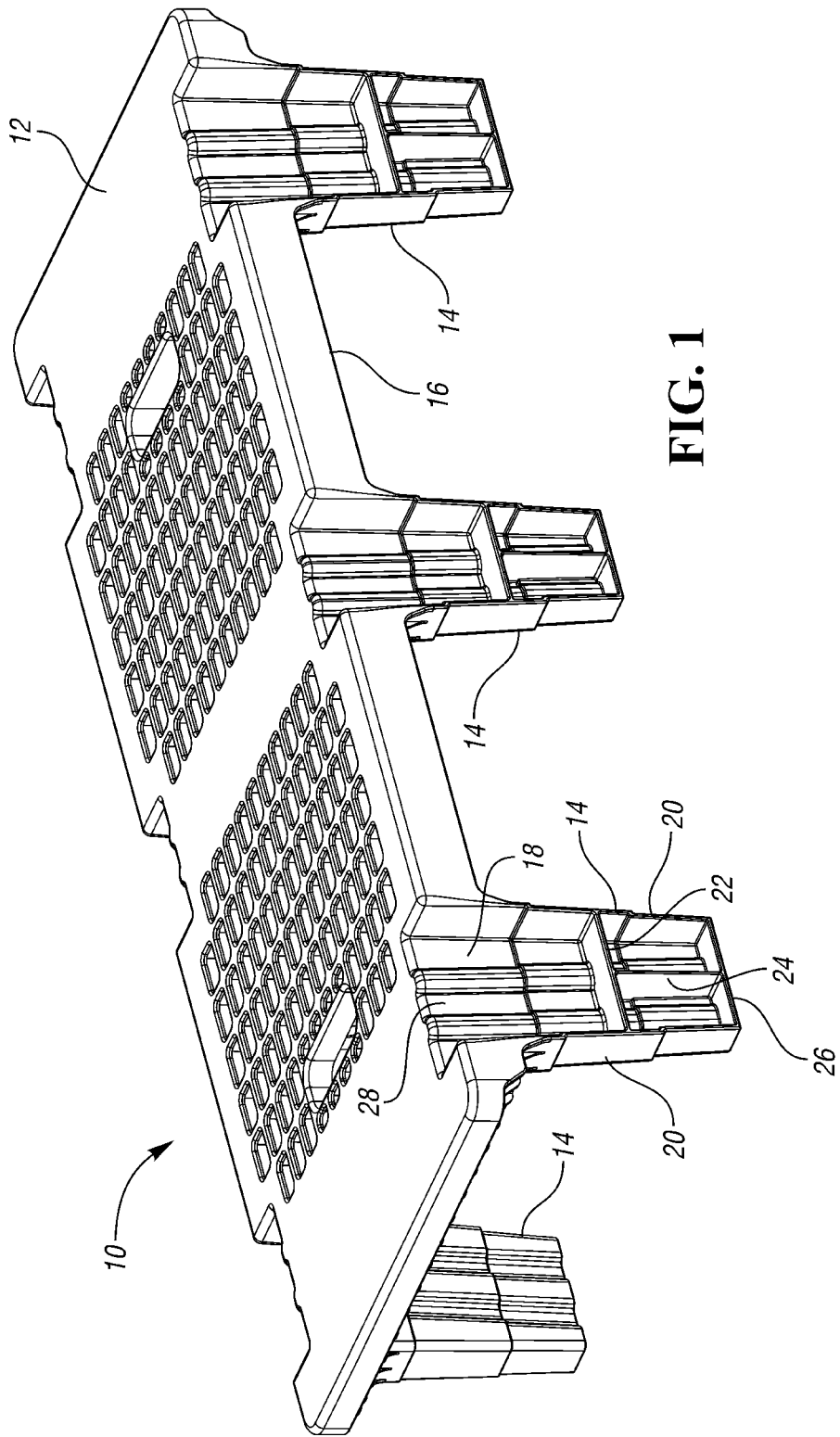
FIG. 1 is a perspective view of a pallet according to a first embodiment.

A pallet 10 is shown in FIG. 1. The pallet 10 is an injection molded plastic pallet 10 having a deck 12 supported above the floor by a plurality of feet 14. The deck 12 includes a plurality of ribs for reinforcement and a lip 16 extending about the periphery. The pallet 10 is "half pallet" size, such as 18"×48", 20"×48", 29"×42".

The feet 14 are hollow and are U-shaped in cross-section, opening outward. This reduces the footprint of the pallet 10, but optionally, the feet 14 could have an outer wall enclosing the feet 14. The feet 14 each include an inner wall 18, which may be corrugated as shown, for strength. The feet 14 each include opposed side walls 20 and a bottom wall 26. A horizontal reinforcing wall 22 connects the inner wall 18 and side walls 20 and is spaced above the bottom wall 26. A vertical reinforcing wall 24 extends vertically from the bottom wall 26 to the horizontal reinforcing wall 22. The deck 12 has an opening 28 aligned with each foot 14, leading into each foot 14, so that the pallet 10 is nestable.

The pallet 10 includes three feet 14 along each long side of the deck 12. The feet 14 are each open outward of the pallet 10. The feet 14 are each oblong, parallel to the long dimension of the pallet 10.

FIG. 2 shows the pallet 10 nesting with an identical pallet 10. The open sides of the feet 14 permit a high nesting increment. The bottom walls 26 of the feet 14 of the upper pallet 10 abut the horizontal reinforcing wall 22 of the feet 14 of the lower pallet 10.

An inventive lift 50 that can be used with the pallet 10 is shown in FIG. 3. The lift 50 includes four tines, two outer tines 52 and two inner tines 54. In the retracted position shown, the outer tines 52 are very close to (or abutting) the inner tines 54. Each tine 52, 54 is supported near an outer end (at least, outward of a center point) by an on-center wheel 56 (on-center laterally, but forward of a mid-point longitudinally). In this example configuration all four over center 8"-10" diameter wheels 56 are in contact with the ground. The four wheels 56 can either be powered or non-powered depending on the desired approach.

Front wheels 58 located on an angled front of the tine 52, 54 prevent the tine from impacting a ramp and bottoming out.

A support mechanism 60 supports the tines 52, 54 in the retracted and expanded positions. The support mechanism 60 may include hydraulics or motors with threaded rods or other devices to move outer portions of the support mechanism 60 that are fixed to the outer tines 54 inward and outward relative to an inner portion of the support mechanism 60 that is fixed to the inner tines 52.

A lift mechanism 62, such as hydraulic, electric, etc, can raise and lower the tines 52, 54. The lift 50 also includes upright handles 64, which reduce the footprint of the lift 50 and permit easier handling in limited spaces. An activation handle 66 controls the raising and lowering of the tines 52, 54. A pair of rear wheels 68 supports the rear of the lift 50.

The upright handles 64 provide an alternative to transporting pallets. The upright handles 64 significantly reduce the required footprint to maneuver a pallet 10 in comparison to a standard pallet jack. Reducing the footprint increases the maneuverability of the upright pallet lift 50 and loaded pallet 10 in areas such as the back of the trailer or in a store.

This concept also has large surface areas over the handles 64 available for branding based on the customer's color(s) and logo(s). The large surface area of the shielding hides the hydraulic components used to lift the pallet 10. This minimizes the industrial look of the equipment in order to make it more acceptable for use in store.

FIG. 4 is a front view of the lift 50 of FIG. 3. FIG. 5 is a side view of the lift 50 of FIG. 3.

As shown in FIGS. 6 and 7, the tines 52, 54 can be inserted through the short end of the pallet 10 between the feet 14, with the tines 52, 54 parallel to the deck 12. The wheels 56 are positioned forward of the center feet 14 of the pallet 10, which is forward of the center of mass of the pallet 10 and any goods supported thereon to improve stability.

As shown in FIG. 8, when the lift mechanism 62 is activated, upper portions 52a, 54a of the tines 52, 54 (respectively) are raised relative to lower portions 52b, 54b of the tines 52, 54 (respectively).

Figure 12:
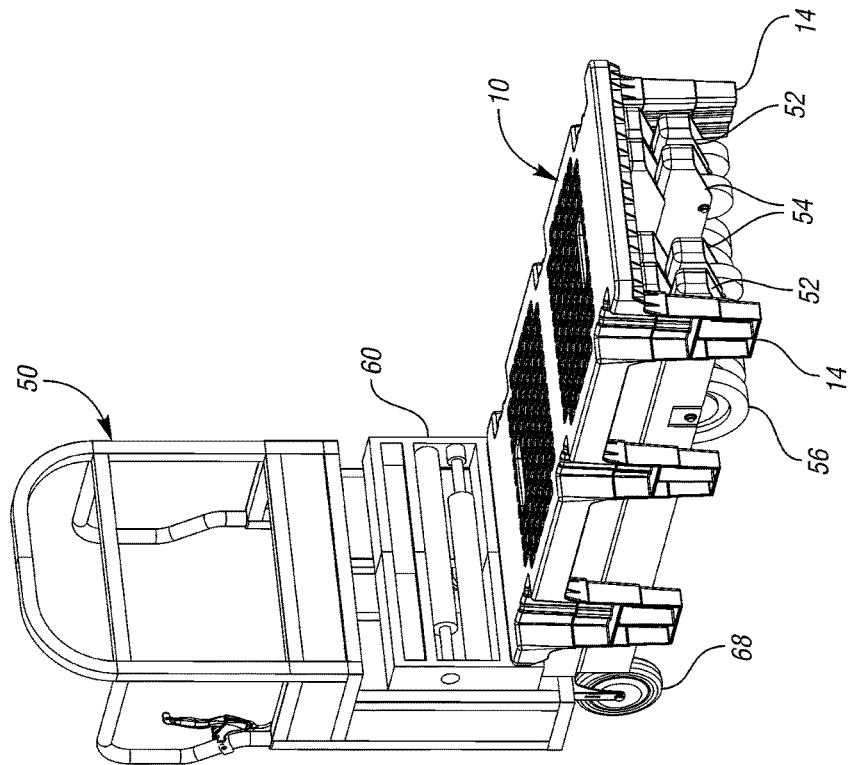
FIG. 12 is a perspective view of the lift and pallet of FIG. 9 in the raised position.
Figure 11:
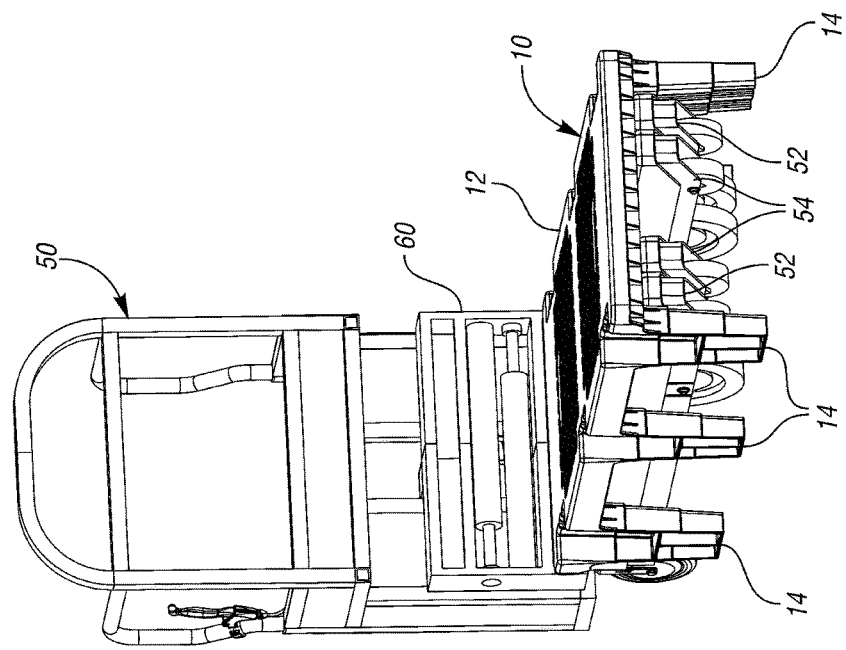
FIG. 11 is a perspective view of the lift and pallet of FIG. 6 in the lowered position.

As shown in FIGS. 9 and 10, when the tines 52, 54 are raised under the deck 12 of the pallet 10, this lifts the pallet 10 off the floor. FIGS. 11 and 12 are perspective views showing the lift 50 and pallet 10 in the lowered and raised positions, respectively.

FIG. 13 shows an optional arrangement in which the pallet 10 is supported perpendicularly to the tines 52, 54 with the center feet 14 of the pallet 10 between the tines 52, 54 and the outer feet 14 outward of the tines 52, 54.

Figure 15:
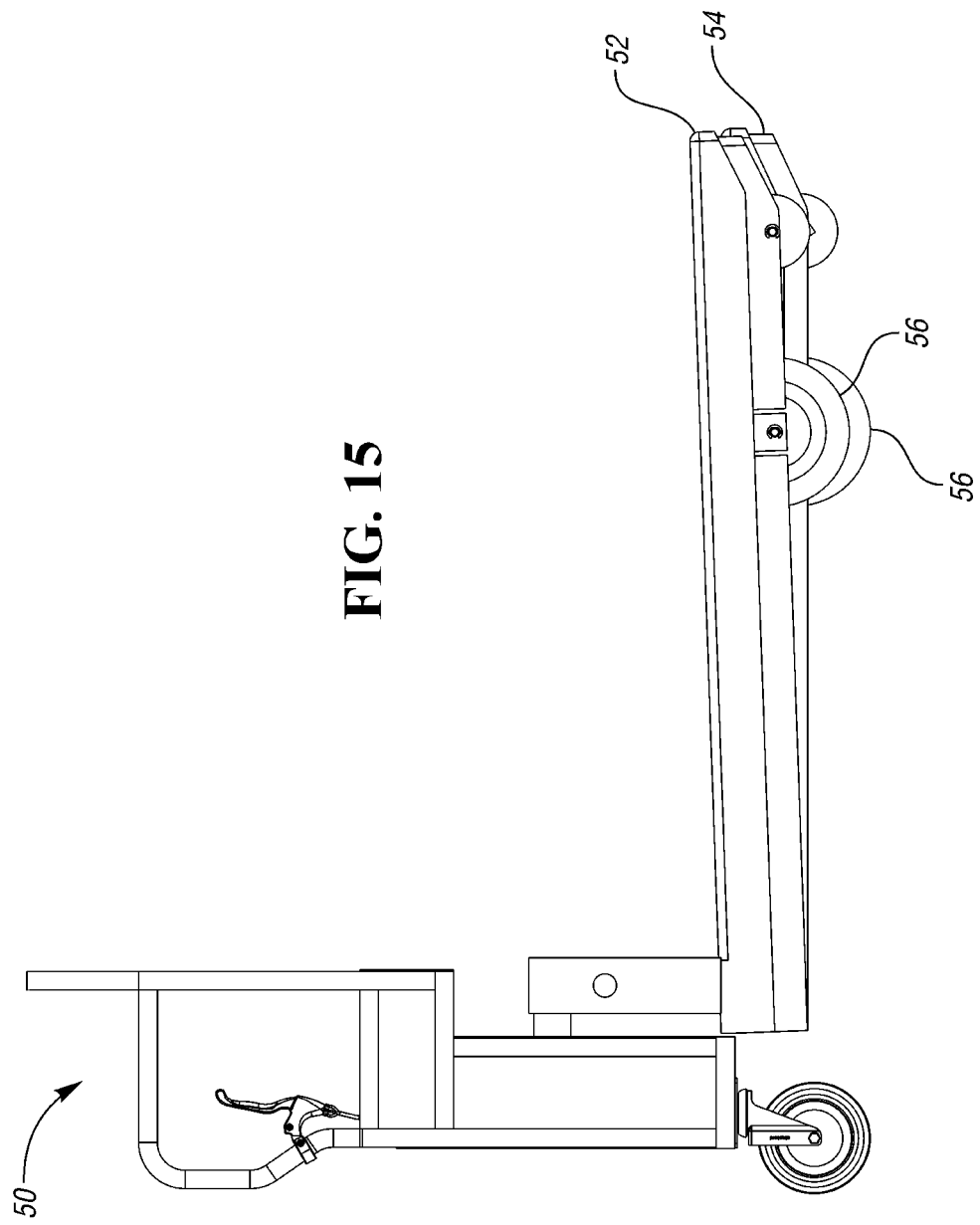
FIG. 15 is a side view of the lift of FIG. 6 showing the outer tines pivoted to raise the wheels off the floor.

In order to convert the lift 50 from the compact configuration to the expanded configuration, several options are possible. First, as shown in FIG. 14 the wheels 56 of the outer tines 52 may be lifted prior to moving the outer tines 52 outward away from the inner tines 54. The wheels 56 would then be lowered back down to the floor before use. As an alternative, shown in FIG. 15, the outer tines 52 may pivot so that the wheels 56 of the outer tines 52 are above the floor prior to the outer tines 52 moving outward away from the inner tines 54. The wheels 56 would then be lowered back down to the floor before use.

Figure 17:
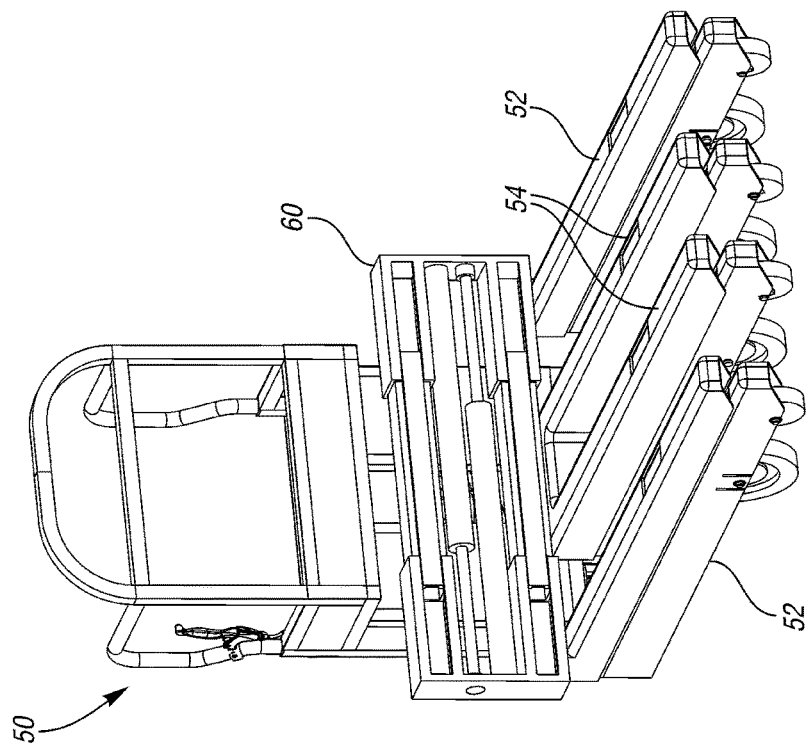
FIG. 17 shows the lift of FIG. 16 in the raised position.
Figure 16:
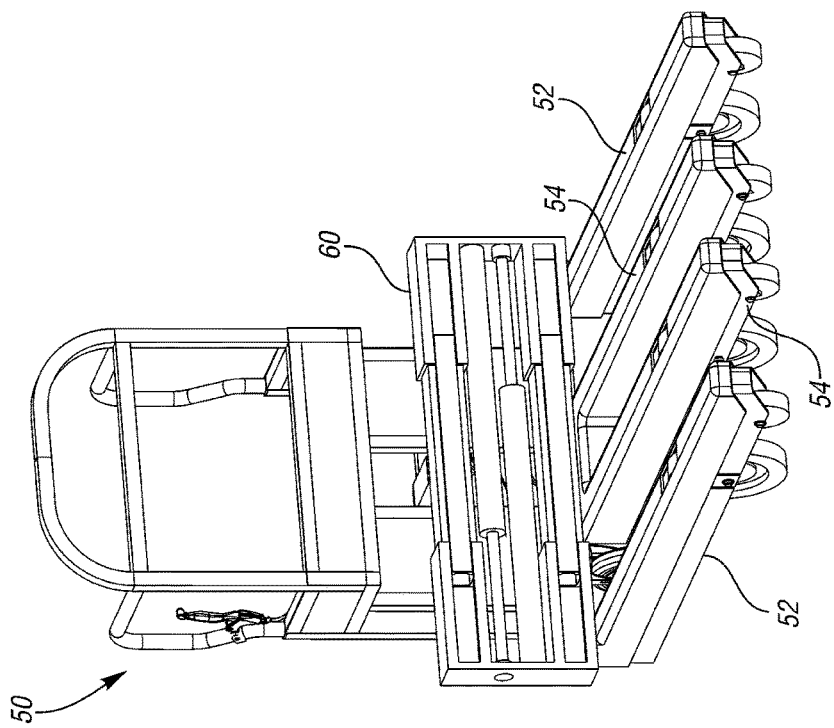
FIG. 16 shows the lift of FIG. 6 in the expanded configuration, with the outer tines spaced outward away from the inner tines.

FIG. 16 shows the lift 50 in the expanded configuration, with the outer tines 52 spaced outward away from the inner tines 54. In FIG. 17, the expanded lift 50 is shown in the raised position.

Figure 18:
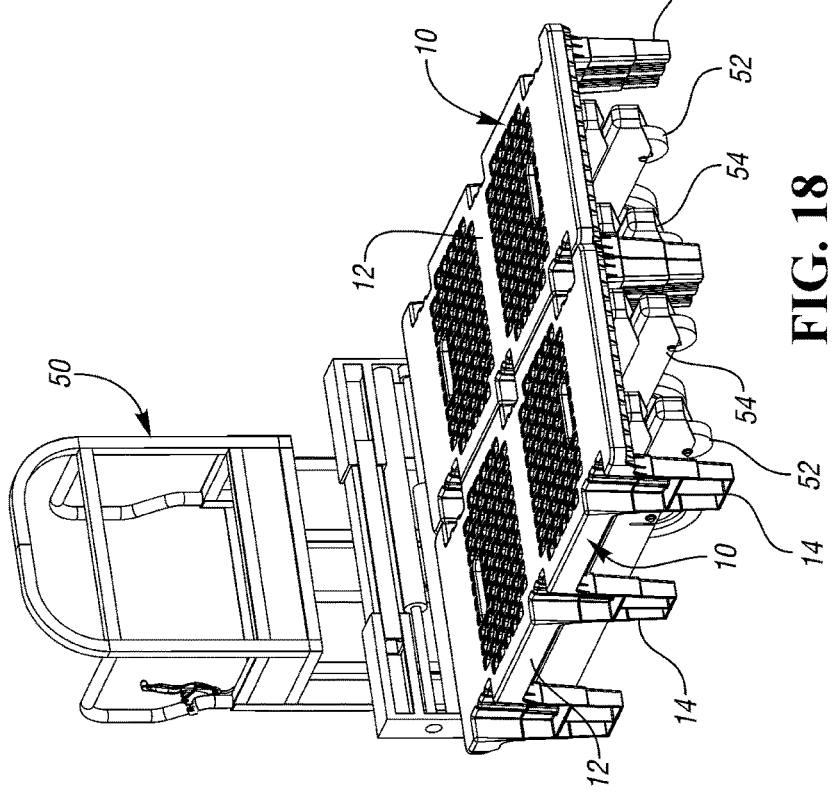
FIGS. 18 and 19 are perspective and front views, respectively, of the lift of FIG. 6 in the expanded configuration supporting two of the pallets of FIG. 1 with the decks parallel to the tines.
Figure 19:
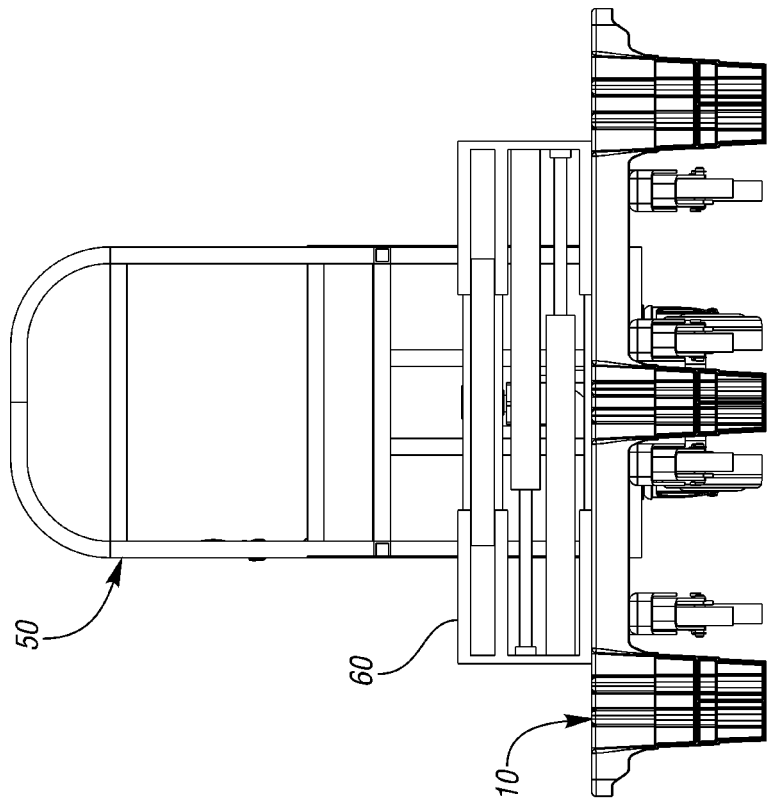

As shown in FIGS. 18 and 19, the lift 50 in the expanded configuration can support two pallets 10 with the decks 12 parallel to the tines 52, 54. Each pallet 10 is supported by an inner tine 54 and an outer tine 52.

Figure 20:
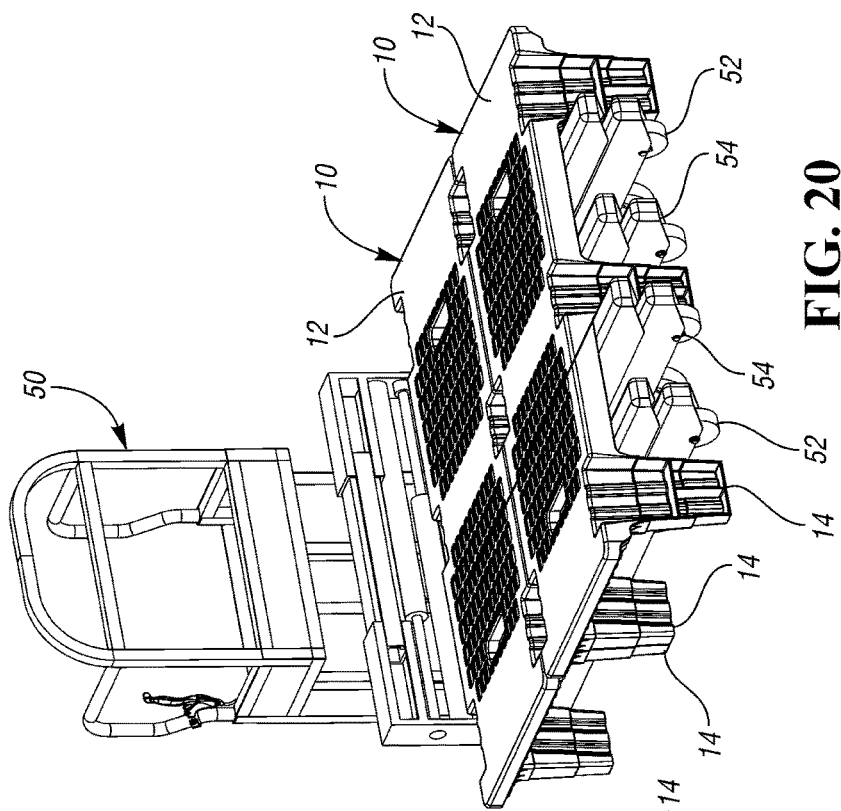
FIGS. 20 and 21 are perspective and front views, respectively, of the lift of FIG. 6 in the expanded configuration supporting two of the pallets of FIG. 1 with the decks perpendicular to the tines
Figure 21:
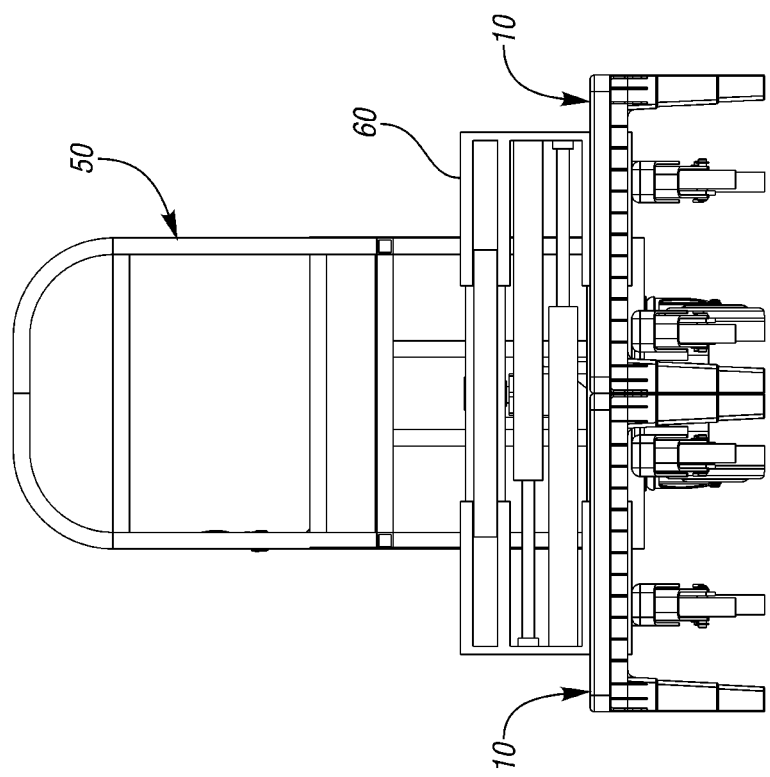

Alternatively, as shown in FIGS. 20 and 21, two pallets 10 can be supported perpendicularly to the tines 52, 54, with all of the center feet 14 received between the inner tines 54 and the outer feet 14 outward of the outer tines 52.

Figure 22:
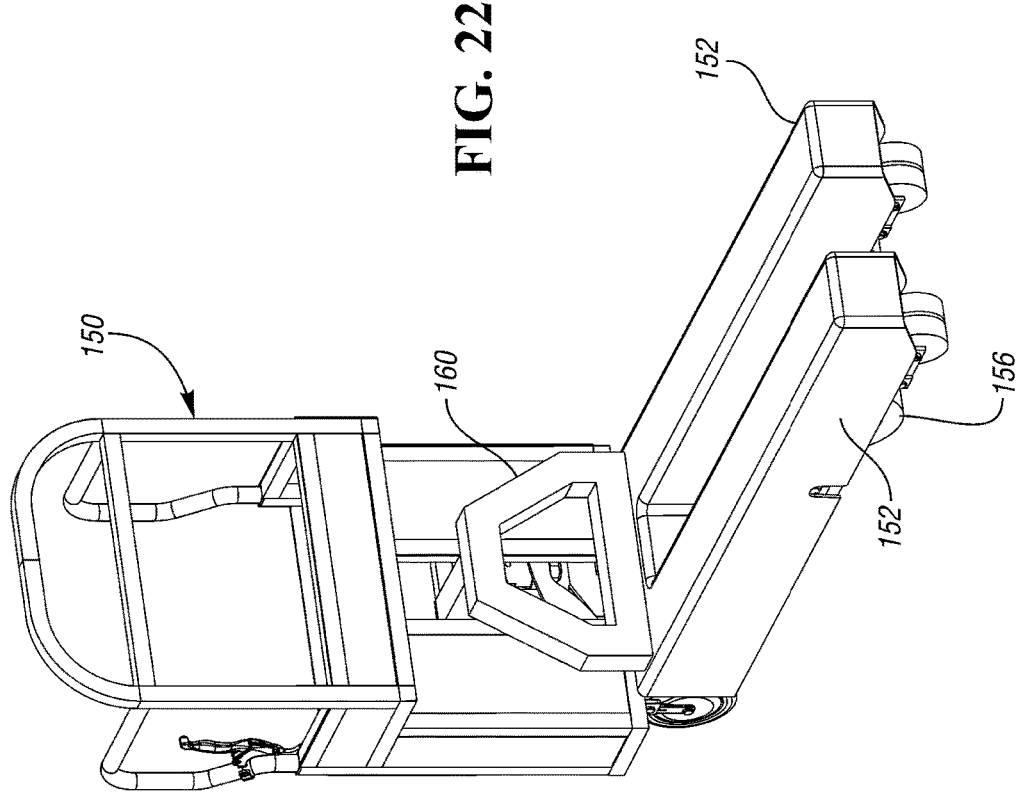
FIG. 22 shows an alternative lift having a single pair of tines.

FIG. 22 shows an alternative lift 150. There is a single pair of tines 152, fixed in the "compact" position. The tines 152 are supported by wheels 156 and by a support mechanism 160.

The lift 50, 150 may be modular. The upright portion of the lift 50, 150 could be provided with multiple fork tine 52, 54, 152 attachments with configurations available based on the users application. The user has the option of converting the fork tines 52, 54 152, regularly or using the upright pallet lift in a dedicated configuration. The modular approach is desirable for users as it provides asset flexibility regarding the lift based a variety of factors the user will encounter in a complex supply chain and unique store configurations during delivery. In addition, the modular approach provides an economical approach to when servicing a complex network. The alternative is to have multiple lift designs in the supply chain for multiple pallet sizes.

Common supply chain factors encountered include irregular trailer length and width, trailer loading equipment or requirements for specialty delivery pallets, standard pallets and specialty delivery pallets being combined for delivery on trailers and pallet configuration to optimize delivery. Unique store configurations result in delivery constraints including trailer offloading area, pallet staging areas, large and narrow door openings for the lift and pallet, large and narrow cooler door openings and aligning with store owners requests based on load size entering the stores.

The upright portion of the lift 50, 150 contain the hydraulic unit 62 used to lift the tines 52, 54, 152 and pallet load. By removing minimal amounts of hardware, the tines 52, 54, 152 can be separated from the upright portion of the lift 50, 150 and another set of fork tines can be selected for the supply chain and unique store configurations. As an alternative to the modular approach, each fork tine attachment could be designed in a dedicated configuration based on supply chain complexity.

Figure 23:
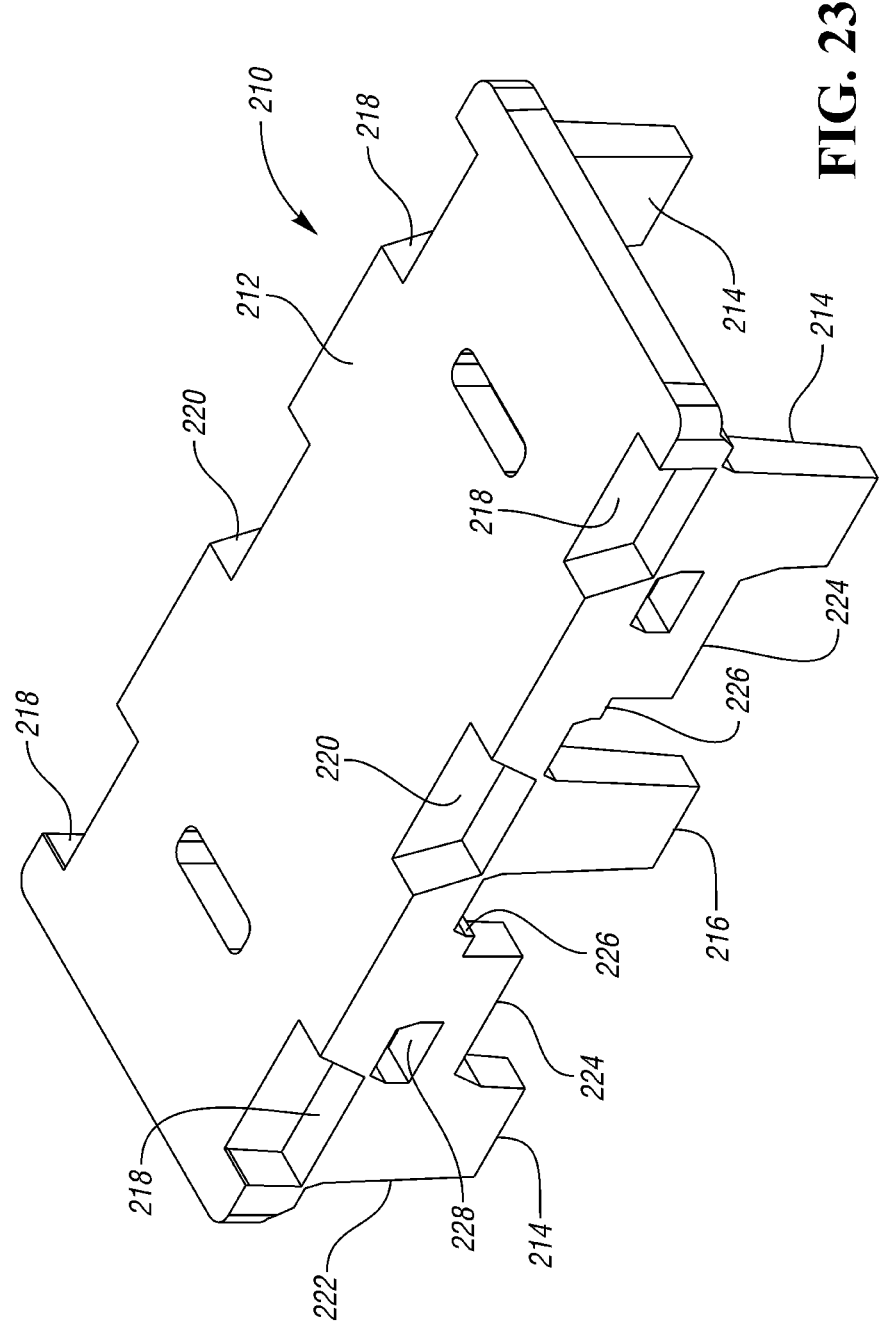
FIG. 23 is a perspective view of a pallet according to a second embodiment.

A pallet 210 is shown in FIG. 23. The pallet 210 is an injection molded plastic pallet 210 having a deck 212 supported above the floor by a plurality of feet 214, 216. The deck 212 may include a plurality of ribs (not shown) for reinforcement. The example pallet 210 is "half pallet" size, such as 18"×48", 20"×48", 29"×42".

The pallet 210 includes two outer or corner feet 214 and an inner or center foot 216 along each long side of the deck 212. The feet 214, 216 are each oblong, parallel to the long dimension of the pallet 210. Above each foot 214, 216 the deck 212 includes a recess 218, 220, respectively, sized to receive the foot 214, 216 of an identical pallet 210.

A side wall 222 extends downward from each side of the deck 212 to form the feet 214, 216. The side wall 222 also forms a ledge 224 extending from each corner foot 214 toward the center foot 216. Inward of the ledge 224 (between the ledge 224 and the center foot 216) is a key feature 226 projecting downward and inward toward the center foot 216. An opening 228 is formed through the side wall 222 above each ledge 224, outward of each key feature 226.

FIG. 24 is a side view of the pallet 210. The side wall 222 can be considered to form a first opening 232 between the ledge 224 and the center foot 216 and a second opening 230 below the ledge 224 and between the corner foot 214 and the center foot 216. The openings 230, 232 may overlap as shown. The key feature 226 projects into the first opening 232. The key feature 226 is at a height that aligns with the opening 228 above the ledge 224.

The other half of the side wall 222 shown in FIG. 24 is symmetrical. The other side wall 222 (not shown) is mirror image of the side wall 222 in FIG. 24.

FIG. 25 is a top view of the pallet 210. FIG. 26 is a bottom view of the pallet 210. FIG. 27 is a bottom perspective view of the pallet 210.

Figure 28:
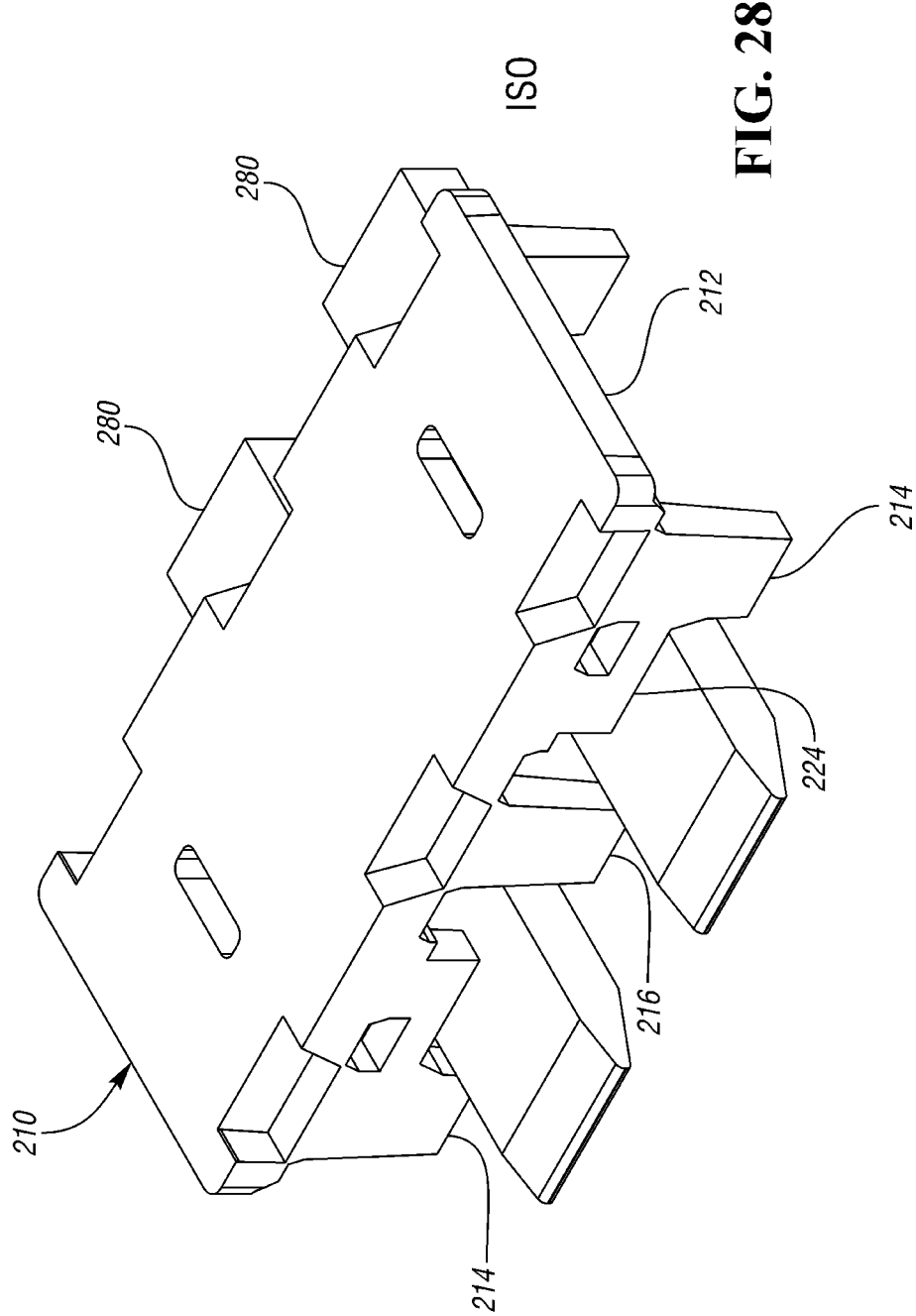
FIGS. 28 and 29 show the pallet of FIG. 23 being engaged by a first type of forks.
Figure 29:
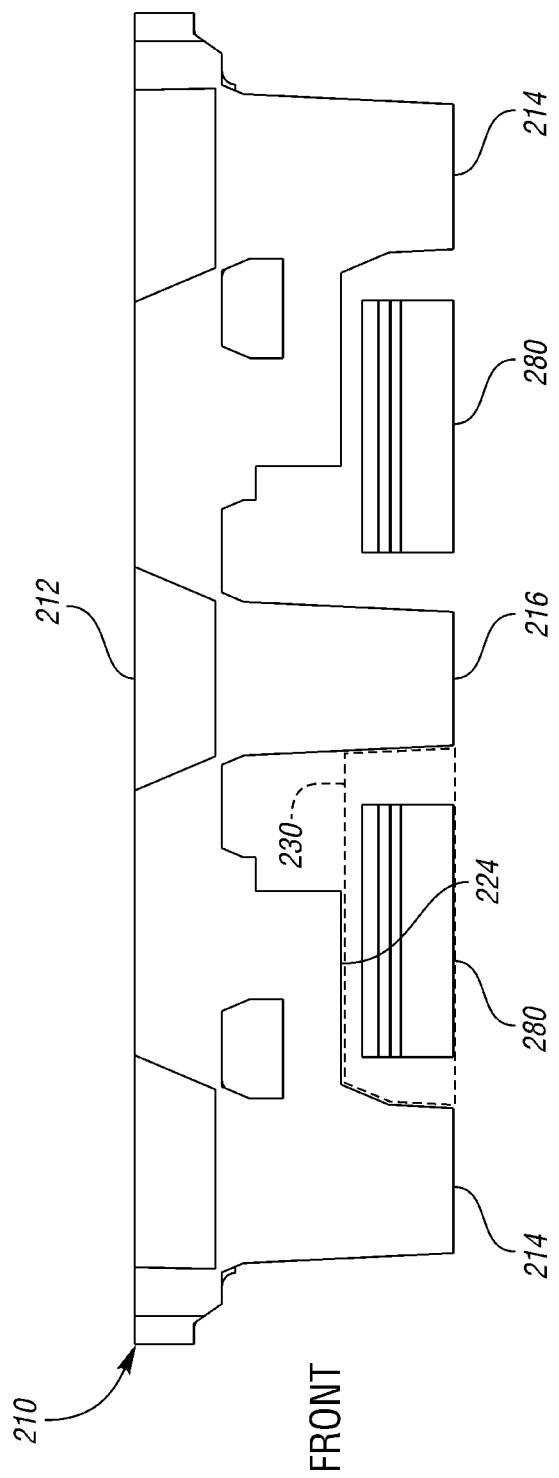

FIGS. 28 and 29 show the pallet 210 being engaged by a first type of fork tines 280, such as might be on a walkie rider. The fork tines 280 are wide but not tall. The fork tines 280 can enter the pallet 210 on either side wall 222 (long side of the pallet 210) through the second opening 230 (FIG. 29). The fork tines 280 can lift the pallet 210 by engaging lowermost surfaces of the ledges 224.

Figure 30:
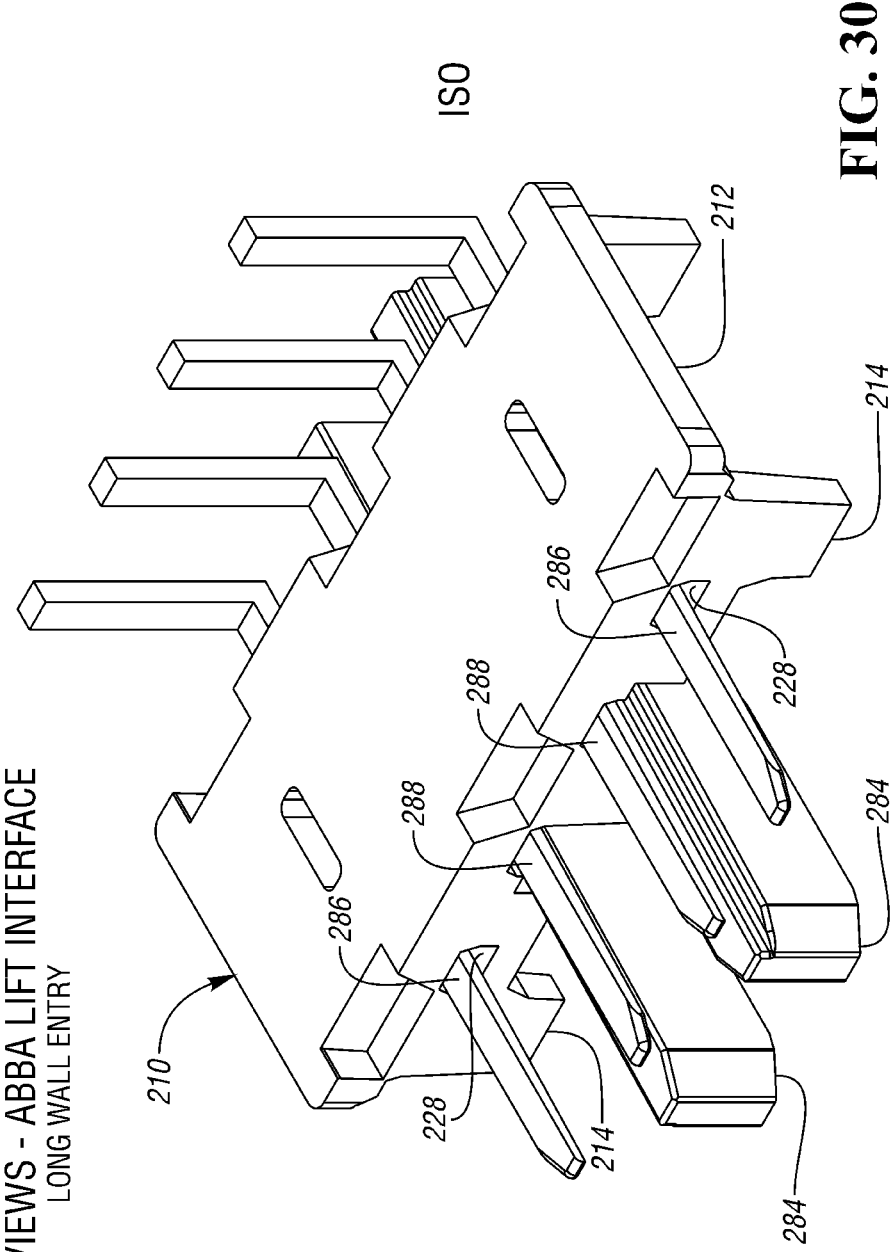
FIGS. 30 and 31 show the pallet of FIG. 23 being engaged by a second type of forks.
Figure 31:
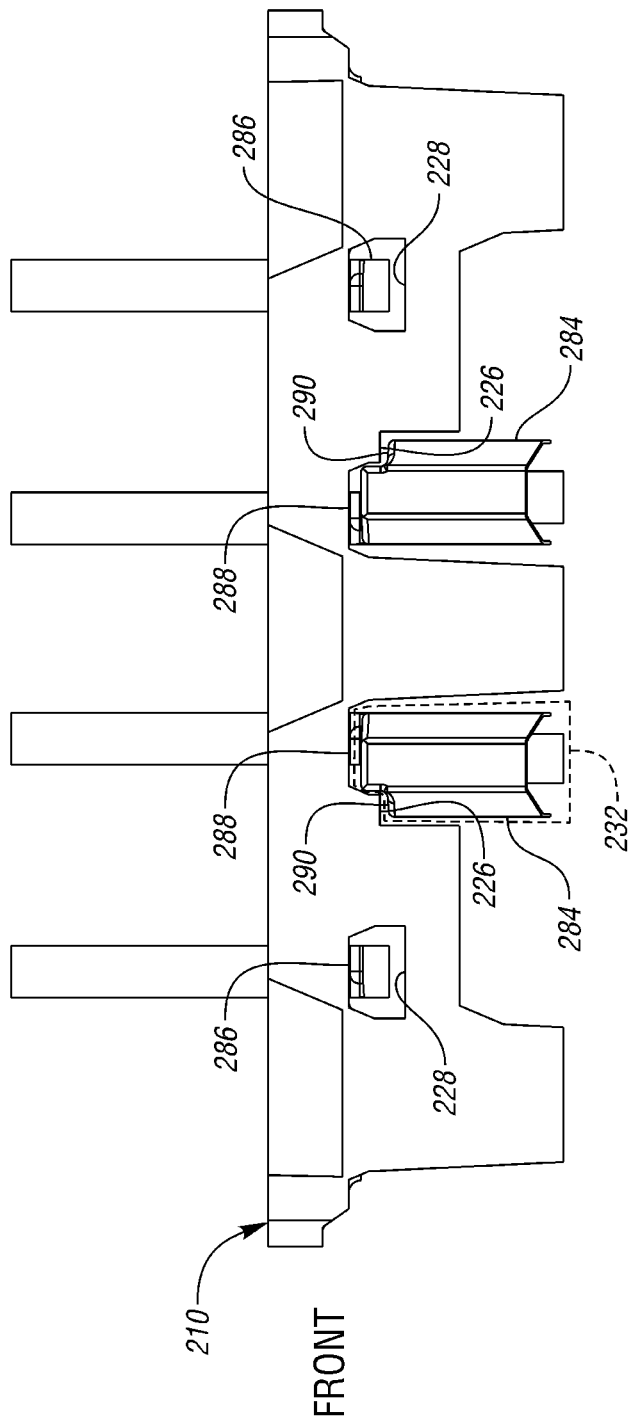

FIGS. 30 and 31 show the pallet 210 being engaged by a second type of fork tines 284, 286, 288 in an expanded configuration. The inner fork tines 288 are secured on top of the lower fork tines 284. In the expanded configuration, the outer fork tines 286 are spaced outward away from the inner fork tines 286, but are at the same height (at least substantially). The second type of fork tines 284, 286, 288 is similar to the lift 50 of FIG. 3, with wheels under the inner tines, but without wheels supporting the outer tines.

Referring to FIG. 31, the lower fork tines 284 and inner fork tines 288 are received in the first openings 232 in the side walls 222. The upper, outer corner of each of the lower fork tines 284 has a notch 290 complementary to the key features 226. The key features 226 are received in the notches 290. The inner fork tines 288 abut the underside of the deck 212. The outer fork tines 286 are received in the openings 228 above the ledges 224 and abut the underside of the deck 212.

Figure 32:
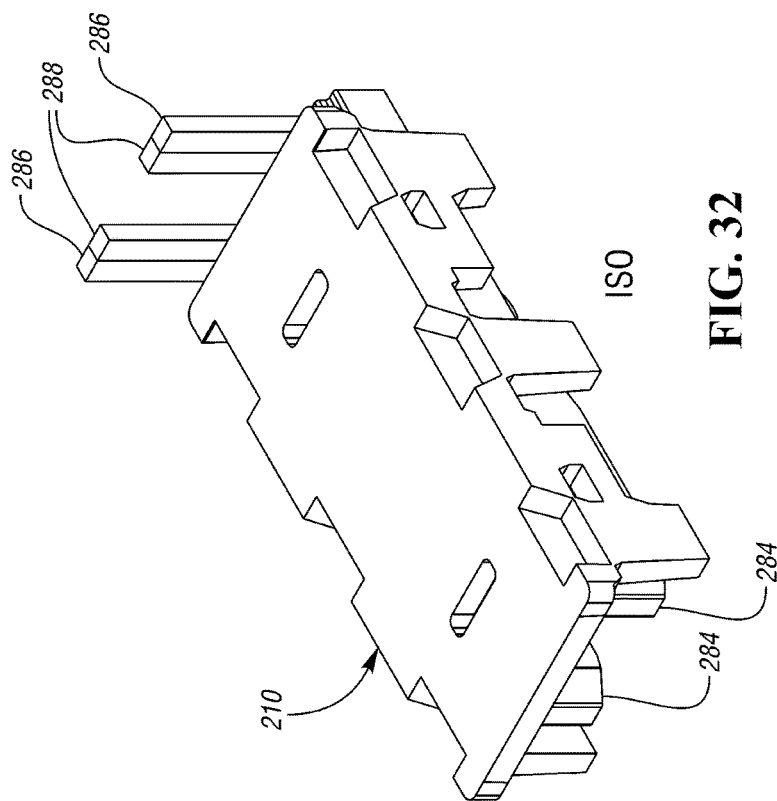
FIGS. 32 and 33 show the forks of FIGS. 30 and 31 engaging the short side of the pallet.
Figure 33:
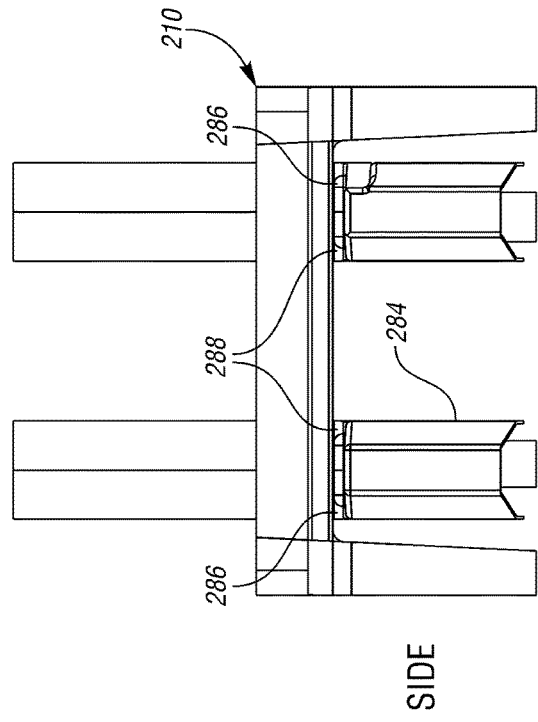

FIGS. 32 and 33 show the fork tines 284, 286, 288 engaging the short side of the pallet 210 when the fork tines 284, 286, 288 are in the collapsed, retracted position. In the collapsed, retracted position, the outer fork tines 286 abut the inner fork tines 288 and are on the lower fork tines 284 above the notches 290. The inner fork tines 288 and outer fork tines 286 abut the underside of the deck 212.

Thus the fork tines 284, 286, 288 can be used to engage the long sides or short sides of the pallet 210. Further, referring again to FIG. 31, it can be seen that if the fork tines 284, 286, 288 were in the collapsed, retracted position, the outer fork tines 286 would impact the key feature 226 in the side wall 222, thus preventing the use of the fork tines 284, 286, 288 to engage the side walls 222 in the collapsed, retracted position. This ensures that the fork tines 284, 286, 288 are used in the most stable configuration.

Figure 34:
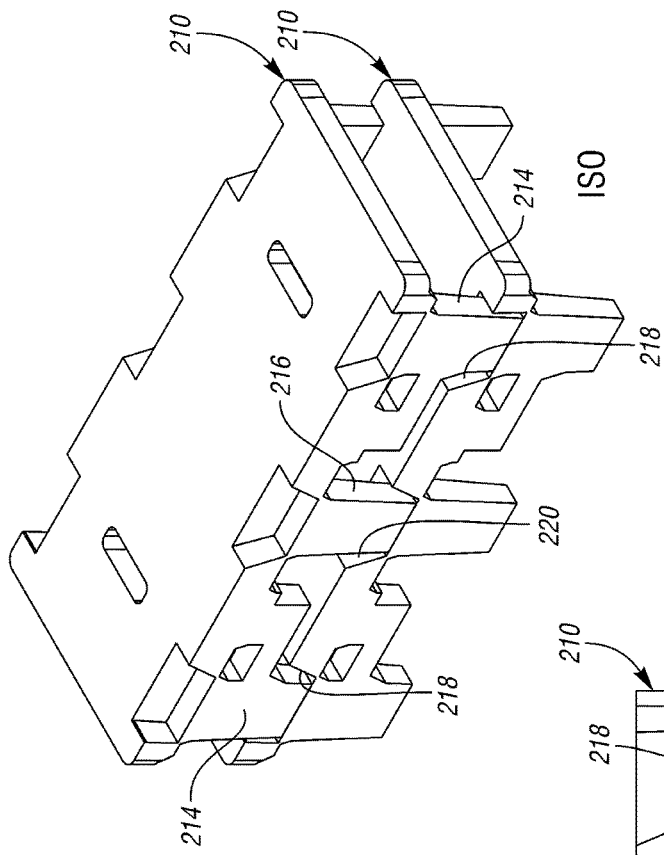
FIGS. 34 and 35 show an identical pallet stacked on the pallet of FIG. 23.
Figure 35:
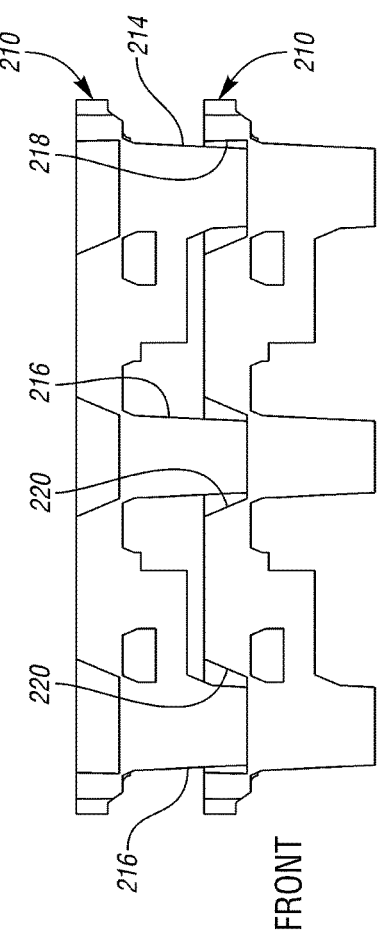

FIGS. 34 and 35 show an identical pallet 210 stacked on the pallet 210. The corner feet 214 are received in the recesses 218 of the lower pallet 210 and the center feet 216 are received in the recesses 220 of the lower pallet 210. This reduces the stacking height of the pallets 210 when not in use.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet lift comprising:
 a lift mechanism;
 at least one inner tine secured to the lift mechanism;
 at least one wheel supporting the at least one inner tine and spaced away from the lift mechanism along a longitudinal axis of the at least one inner tine;
 a pair of outer tines secured to the lift mechanism positioned outward of the at least one inner tine, the pair of outer tines movable between an expanded position spaced outward away from the at least one inner tine and a retracted position adjacent the at least one inner tine; and
 at least one outer wheel supporting each of the pair of outer tines, wherein each at least one outer wheel is capable of being lifted off a floor on which the at least one wheel supporting the at least one inner tine is supported, wherein the at least one outer wheel is liftable prior to the outer tines being moved to the expanded position from the retracted position.

2. The pallet lift of claim 1 wherein the at least one inner tine includes a pair of spaced apart inner tines.

3. The pallet lift of claim 2 wherein each of the outer tines are adjacent one of the inner tines in the retracted position.

4. The pallet lift of claim 3 wherein the at least one wheel includes at least one inner wheel supporting each of the pair of inner tines.

5. The pallet lift of claim 4 wherein each of the outer tines is movable to lift the at least one outer wheel prior to the outer tines being moved to the expanded position from the retracted position.

6. The pallet lift of claim 5 wherein each of the outer tines is pivotable relative to the pair of inner tines to lift the at least one outer wheel prior to the outer tines being moved to the expanded position from the retracted position.

7. The pallet lift of claim 1 wherein the lift mechanism is configured to raise and lower the at least one inner tine and the pair of outer tines.

8. A pallet lift comprising:
 a lift mechanism;
 a pair of inner tines secured to the lift mechanism;
 at least one inner wheel supporting each of the pair of inner tines and spaced away from the lift mechanism along longitudinal axes of the pair of inner tines;

a pair of outer tines secured to the lift mechanism positioned outward of the pair of inner tines, the pair of outer tines movable between an expanded position spaced outward away from the pair of inner tines and a retracted position adjacent the pair of inner tines; and at least one outer wheel supporting each of the pair of outer tines, wherein each of the outer tines is pivotable relative to the pair of inner tines to lift the at least one outer wheel prior to the outer tines being moved to the expanded position from the retracted position.

9. The pallet lift of claim 8 wherein the lift mechanism is configured to raise and lower the pair of inner tines and the pair of outer tines.

10. A pallet lift comprising:
a lift mechanism;
a pair of inner tines secured to the lift mechanism;
at least one inner wheel supporting each of the pair of inner tines and spaced away from the lift mechanism along longitudinal axes of the pair of inner tines;

a pair of outer tines secured to the lift mechanism positioned outward of the pair of inner tines, the pair of outer tines movable between an expanded position spaced outward away from the pair of inner tines and a retracted position adjacent the pair of inner tines; and at least one outer wheel supporting each of the pair of outer tines, wherein each of the outer tines is movable to lift the at least one outer wheel relative to the at least one inner wheel supporting each of the pair of inner tines prior to the pair of outer tines being moved to the expanded position.

11. The pallet lift of claim 10 wherein the outer tines each include an upper portion and a lower portion, wherein the upper portion is raised relative to the lower portion when the lift mechanism is activated.

* * * * *